US012694462B2

(12) United States Patent
Little et al.

(10) Patent No.: US 12,694,462 B2
(45) Date of Patent: *Jul. 28, 2026

(54) NETWORK COMPUTER SYSTEM AND METHODS FOR USE IN OPERATING CASINO PATRON LOYALTY PROGRAMS

(71) Applicant: Station Casinos LLC, Las Vegas, NV (US)

(72) Inventors: William Chad Little, Las Vegas, NV (US); Jon Von Tobel, Las Vegas, NV (US); Tom Mikulich, Las Vegas, NV (US); Pat Gordon, Las Vegas, NV (US)

(73) Assignee: Station Casinos LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,580

(22) Filed: Jun. 12, 2024

(65) Prior Publication Data

US 2024/0428360 A1    Dec. 26, 2024

Related U.S. Application Data

(63) Continuation of application No. 17/530,314, filed on Nov. 18, 2021, now Pat. No. 12,056,784.

(60) Provisional application No. 63/115,939, filed on Nov. 19, 2020.

(51) Int. Cl.
*G06Q 50/34* (2012.01)
*G06Q 30/0207* (2023.01)
(Continued)

(52) U.S. Cl.
CPC ......... *G06Q 50/34* (2013.01); *G06Q 30/0209* (2013.01); *G06Q 30/0215* (2013.01);
(Continued)

(58) Field of Classification Search
CPC .............. G06Q 50/34; G06Q 30/0209; G06Q 30/0215; G06Q 30/0226; G07F 17/3239;
(Continued)

(56) References Cited

U.S. PATENT DOCUMENTS 8,429,224 B2    4/2013  Patel et al.
8,671,019 B1    3/2014  Barclay et al.
(Continued)

OTHER PUBLICATIONS

"Video game interaction and reward mechanisms applied to business applications"—A comparative review Diogo Lopes I&D—Inovação e Desenvolvimento, Link Consulting, S. A. (Year: 2012) (Year: 2012).*

*Primary Examiner* — Alexandru Cirnu

(74) *Attorney, Agent, or Firm* — Howard & Howard Attorneys PLLC

(57) ABSTRACT

A networked computer system for providing a casino patron loyalty program is described herein. The networked computer system includes a promotions management computer server that is coupled to a plurality of player tracking servers. The promotions management computer server includes a processor programmed to execute an algorithm including the steps of receiving a gaming request signal from a player tracking server indicating a request from a patron to initiate a gaming session, displaying a gaming charm selection screen on the gaming device, receiving a patron selected gaming charm and responsively generating an escrowed award record in an award escrow data file that includes a session ID, the patron ID, the device ID, and a charm ID associated with the patron selected gaming charm.

17 Claims, 18 Drawing Sheets

(51) Int. Cl.
  *G06Q 30/0226*       (2023.01)
  *G07F 17/32*         (2006.01)
  *H04L 67/12*         (2022.01)

(52) U.S. Cl.
  CPC ..... *G06Q 30/0226* (2013.01); *G07F 17/3239* (2013.01); *G07F 17/3255* (2013.01); *G07F 17/3262* (2013.01); *G07F 17/3267* (2013.01); *H04L 67/12* (2013.01)

(58) Field of Classification Search
  CPC ............. G07F 17/3255; G07F 17/3262; G07F 17/3267; H04L 67/12
  See application file for complete search history.

(56)            References Cited

U.S. PATENT DOCUMENTS

| | | | |
|---|---|---|---|
| 8,771,082 B2 * | 7/2014 | Arezina | G07F 17/32 463/40 |
| 8,926,425 B2 | 1/2015 | Link et al. | |
| 9,728,036 B2 | 8/2017 | Arnone et al. | |
| 9,747,750 B2 | 8/2017 | Link et al. | |
| 9,799,165 B2 | 10/2017 | LeMay et al. | |
| 10,186,111 B2 | 1/2019 | Antkowiak et al. | |
| 10,482,712 B2 | 11/2019 | Link et al. | |
| 10,614,661 B2 | 4/2020 | Simons | |
| 10,832,522 B2 | 11/2020 | Simons | |
| 10,984,400 B1 | 4/2021 | Koch | |
| 11,024,123 B2 | 6/2021 | Oberberger | |
| 2008/0076571 A1 * | 3/2008 | Frerking | G07F 17/32 463/42 |
| 2014/0080590 A1 | 3/2014 | Link | |
| 2014/0141868 A1 * | 5/2014 | Kelly | G07F 17/3225 463/25 |
| 2016/0379444 A1 * | 12/2016 | LeMay | G07F 17/3225 463/25 |
| 2019/0299105 A1 | 10/2019 | Knight et al. | |
| 2019/0385136 A1 | 12/2019 | Blagov et al. | |
| 2020/0193776 A1 | 6/2020 | Oberberger | |
| 2020/0242105 A1 | 7/2020 | Rich et al. | |
| 2021/0118085 A1 | 4/2021 | Bushnell et al. | |
| 2022/0366762 A1 | 11/2022 | Nelson et al. | |

* cited by examiner

302 — DETECT GAMING SESSION INITIATED BY PLAYER

304 — DISPLAY GAMING CHARM SELECTION SCREEN

306 — GENERATE PLAYER ESCROW ACCOUNT

308 — DETECT PROMOTIONAL AWARD TRIGGER EVENT

310 — SELECT PROMOTION AWARD GAMING CHARM

312 — DISPLAY BONUS GAME TO PATRONS WITH MATCHING GAMING CHARMS

300

400

402 — MONITOR PATRON ACTIVITY

404 — DETECT QUALIFYING EVENT

406 — SELECT PROMOTIONAL AWARD

408 — MODIFY PLAYER ESCROW ACCOUNT AS QUALIFIED AND INCLUDE PROMOTIONAL AWARD

410 — DETECT DISQUALIFYING EVENT

412 — MODIFY PLAYER ESCROW ACCOUNT AS UNQUALIFIED

30

| Patron ID | Card/Tier Level | Available Gaming Charm IDs | Available Accessory IDs | Status Credits | Points | Promotion Award Value |
|---|---|---|---|---|---|---|
| Player0110 | Gold | Charm001; Charm325; Charm251 | Accessory325.01; Accessory251.12 | 10,252 | 1,250 | $300 |
| Player00235 | Platinum | Charm001 | Accessory001.52 | 68,000 | 2,050 | $50 |
| Player03252 | Chairman | Charm125; Charm625 | Accessory125.02; Accessory625.01 | 353,320 | 10,250 | $125 |
| Player11256 | President | Charm589; Charm125 | Accessory125.01 | 125,000 | 12,023 | $5 |
| Player12002 | Preferred | Charm010; Charm100; Charm101; Charm111 | Accessory010.01; Accessory111.25 | 850 | 5,320 | $5 |

| Card/Tier Level | Award Prize | Value | Selection Probability |
|---|---|---|---|
| High | Top Award | $100.00 | 0.05 |
| | Mid Award | Prize.005 | 0.25 |
| | Low Award | Prize.001 | 0.70 |
| Med | Top Award | $50.00 | 0.10 |
| | Mid Award | $20.00 | 0.20 |
| | Low Award | $5.00 | 0.70 |
| Low | Top Award | Prize.015 | 0.05 |
| | Mid Award | Prize.005 | 0.20 |
| | Low Award | Prize.001 | 0.75 |

| Award Liability Value | Award Prize | Value | Selection Probability |
|---|---|---|---|
| $100,000 - $1,000,000 | Top Award | $100.00 | 0.05 |
| | Mid Award | Prize.005 | 0.25 |
| | Low Award | Prize.001 | 0.70 |
| $50,000-$99,999 | Top Award | $50.00 | 0.10 |
| | Mid Award | $20.00 | 0.20 |
| | Low Award | $5.00 | 0.70 |
| $0-49,999 | Top Award | Prize.015 | 0.05 |
| | Mid Award | Prize.005 | 0.20 |
| | Low Award | Prize.001 | 0.75 |

52
54
56

| Charm ID | Charm Image Object Data | Card/Tier Level | Promotion Points Purchase Price | Selection Probability |
|---|---|---|---|---|
| Charm325 | Charmimageobject302 | High | 1000 | 0.05 |
| Charm302 | Charmimageobject325 | High | 500 | 0.25 |
| Charm312 | Charmimageobject365 | High | 100 | 0.70 |
| Charm200 | Charmimageobject201 | Medium | 500 | 0.10 |
| Charm220 | Charmimageobject256 | Medium | 200 | 0.20 |
| Charm226 | Charmimageobject285 | Medium | 100 | 0.70 |
| Charm101 | Charmimageobject158 | Low | 100 | 0.05 |
| Charm102 | Charmimageobject189 | Low | 50 | 0.20 |
| Charm103 | Charmimageobject198 | Low | 10 | 0.75 |

| Charm ID | Accessory ID | Accessory Image Object Data | Promotion Points Purchase Price |
|---|---|---|---|
| Charm325 | Accessory325.01 | Accessoryimageobject302 | 10 |
| | Accessory325.15 | Accessoryimageobject355 | 10 |
| | Accessory325.85 | Accessoryimageobject388 | 50 |
| Charm200 | Accessory200.02 | Accessoryimageobject252 | 10 |
| | Accessory200.01 | Accessoryimageobject222 | 10 |
| | Accessory200.12 | Accessoryimageobject235 | 25 |
| Charm101 | Accessory101.01 | Accessoryimageobject152 | 10 |
| | Accessory101.12 | Accessoryimageobject111 | 25 |
| | Accessory101.08 | Accessoryimageobject189 | 25 |

| Patron ID | Activity Session ID | Patron Selected Charm ID | Device ID | Property ID | Patron Activity | Qualification Designation |
|---|---|---|---|---|---|---|
| Player0225 | GameSess020 | Charm001 | EMG.002 | Casino002 | Card-In | Qualifying |
| Player0252 | GameSess125 | Charm984 | MOBILE.02 | Casino001 | Log-Out | Disqualifying |
| Player0128 | GameSess036 | Charm084 | EGM.102 | Casino003 | < $5/hr slot | Disqualifying |
| Player3265 | AcctSess058 | Charm015 | KIOSK.02 | Casino002 | Card-In | Qualifying |
| Player0685 | SpaSess062 | Charm215 | POS.125 | Casino002 | Spa Purchase | Qualifying |

| Promotion Type | Promotion Engine | Qualifying Event | Disqualifying Event |
|---|---|---|---|
| EGM Play | Slotpromo.pgm | Card-In; $/hr Slot play; | Card-out; Promo elapse time |
| Property Purchase | Purchasepromo.pgm | POS purchase | Promo elapse time |
| Mobile Access | Mobilepromo.pgm | Mobile log-in Mobile purchase | Mobile log-out; Promo elapse time |

FIG. 13

| Patron ID | Activity Session ID | Patron Selected Charm ID | Device ID | Property ID | Prize Award | Notification Program file | Qualification Flag ID "Qualified" |
|---|---|---|---|---|---|---|---|
| Player0225 | GameSess020 | Charm001 | EMG.002 | Casino002 | $5.00 | MSG.002 | True |
| Player0252 | GameSess125 | Charm984 | MOBILE.02 | Casino001 | Prize.01 | MSG.020 | False |
| Player0128 | GameSess036 | Charm084 | EGM.102 | Casino003 | Prize.20 | MSG.125 | False |
| Player3265 | AcctSess058 | Charm015 | KIOSK.02 | Casino002 | $5.00 | MSG.002 | True |
| Player0685 | SpaSess062 | Charm215 | POS.125 | Casino002 | $100.00 | MSG.165 | True |

FIG. 14

```
{
    "_id" : ObjectId("59f6470459fc7f001ce07314"),
    "promoUUID" : "4321e9f9-872df-4a43-81c8-fe45002345f",
    "segmentUUID" : "6870574cee005g3236e774ef",
    "customerUUID" : "97c604db-e9d7-4f7f-8aa7-f5f3b0295fdc",
    "sessionId" : "7ec1bb4b-ead2-40ca-918e-30fbec3c1f6d",
    "charmId" : " charm001",
    "qualified" : false,
    "activeProperty" : "sunset",
    "activeEGMLocation" : "047805",
    "sessionStartDateTime" : ISODate("2017-10-29T14:24:20.573-0700"),
    "restrictToWinningProperty" : true,
    "awardCost" : NumberInt(10),
    "awardMessage" : {
        "body" : {
            "restrictToExpireFromCreditDate" : {
                "value" : NumberInt(1),
                "type" : "week"
            },
            "sourceMetaData" : {
                "eventPropertyGroup" : "10",
                "eventName" : "PC7O10D",
                "eventLevel" : "02"
            },
            "sourceItemId" : "6870574cee005g3236e774ef",
            "sourceItemType" : "segmentId",
            "sourceType" : "",
            "sourceServiceId" : "",
            "sourceService" : "",
            "sourceLocation" : "047805",
            "property" : "sunset",
            "amount" : NumberInt(10),
            "transactionType" : "credit",
            "account" : "xpcCMS"
        },
        "header" : {
            "customerUUID" : "97c604db-e9d7-4f7f-8aa7-f5f3b0295fdc",
            "tripId" : "ad8e0588-e1fc-45af-8339-2d2a90fb9f17",
            "originatorHeader" : {
                "location" : {
                    "value" : "047805",
                    "property" : "sunset",
                    "type" : "egm"
                },
                "customerUUID" : "97c604db-e9d7-4f7f-8aa7-f5f3b0295fdc",
                "endDateTime" : "2017-10-29T20:31:25.000Z",
                "startDateTime" : "2017-10-29T20:31:25.000Z",
                "type" : "egm.slots",
                "sessionId" : "7ec1bb4b-ead2-40ca-918e-30fbec3c1f6d",
                "routingKey" : "egm.sunset.active",
                "eventDateTime" : "2017-10-29T21:23:48.753Z",
                "originatorId" : "125c0ce7-1d54-4519-81e0-f838da3ef511"
            },
            "originatorId" : "125c0ce7-1d54-4519-81e0-f838da3ef511",
            "eventDateTime" : "2017-10-29T21:23:48.875Z",
            "routingKey" : "ams.credit"
```

```
        }
      },
132 ──── "ismMessage" : {                                      114
          "body" : {                                           118
            "magstripe" : "013042131416752748",
            "gamecode" : NumberInt(2),                          126
            "messageToneABI" : true,
            "messageTimeToPlay" : NumberInt(10),
            "displayMessage" : "Congrats!!You won \\x17\\x01$10.00 free slot play!!",
            "creditValue" : NumberInt(1000),
            "account" : "xpc"
          },                                                    128
          "header" : {
            "tripId" : "ad8e0588-e1fc-45af-8339-2d2a90fb9f17",
            "routingKey" : "ism.sunset.sessionupdate",
            "customerUUID" : "97c604db-e9d7-4f7f-8aa7-f5f3b0295fdc",
            "eventDateTime" : "2017-10-29T21:24:20.570Z",
            "originatorHeader" : {
              "location" : {
                "value" : "047805",
                "property" : "sunset",
                "type" : "egm"
              },
              "customerUUID" : "97c604db-e9d7-4f7f-8aa7-f5f3b0295fdc",
              "endDateTime" : "2017-10-29T20:31:25.000Z",
              "startDateTime" : "2017-10-29T20:31:25.000Z",
              "type" : "egm.slots",
              "sessionId" : "7ec1bb4b-ead2-40ca-918e-30fbec3c1f6d",
              "routingKey" : "egm.sunset.active",
              "eventDateTime" : "2017-10-29T21:23:48.753Z",
              "originatorId" : "125c0ce7-1d54-4519-81e0-f838da3ef511"
            },
            "originatorId" : "125c0ce7-1d54-4519-81e0-f838da3ef511"
          }
        },
        "clcBonusName" : "WOF",
        "__v" : NumberInt(0)
      }
```

NETWORK COMPUTER SYSTEM AND METHODS FOR USE IN OPERATING CASINO PATRON LOYALTY PROGRAMS

CROSS-REFERENCE TO RELATED APPLICATION

This application is a continuation of U.S. patent application Ser. No. 17/530,314 filed Nov. 18, 2021, which claims the benefit of U.S. Provisional Patent Application Ser. No. 63/115,939 filed Nov. 19, 2020, the disclosures of which is hereby incorporated by reference in their entirety.

FIELD OF THE DISCLOSURE

The present invention relates to networked computer systems for casino property management systems, and more particularly, to systems, methods, and computer-readable storage media for operating casino patron loyalty programs.

BACKGROUND

As the increasingly globalized society accelerates its waves of new technology and innovation, the gaming industry has been impacted by two inversely related trends. Most significantly the technological advances in gaming, while greatly enhancing operational efficiencies, have had a profoundly negative impact on the value proposition of the casino experience for guests. As this casino experience value proposition continues to degrade, the number of competitors striving for a stake of guests' wallets is constantly multiplying, as is their ease of access into those wallets. As a result, the efficacy of casino loyalty programs diminish over time and continues to utilize overplayed tactics that are ubiquitous within the gaming industry. At least some known casino management systems are programmed to monitor casino patron activities and qualify patrons for promotional awards based on the monitored activity to attract and retain patrons at casino properties. In addition, known casino management systems may be programmed to provide promotional awards upon the predefined event, such as a time of day, or day of the week. For example, known casino management systems may be programmed to provide a promotional award to each patron playing a qualifying electronic gaming machine at a predefined time of day. However, these known systems require a significant use of computing resources at the time of providing the promotional awards. For example, upon detecting the occurrence of the predefined event, the system must dedicate significant computer resources to quickly identify each qualified player, associate a promotional award to the player, and generate and transmit a notification message to the player to notify the players of the awards, which reduces the amount of resources available for other monitoring and reporting activities. If random trigger events are implemented, significant stand-by computer resources are required to maintain system operations during a trigger event. As such, these known systems are limited in their ability to quickly notify players of awards, and are non-scalable across multiple casino properties. The present invention is aimed at one or more of the problems identified above.

SUMMARY OF THE INVENTION

In one aspect of the present invention, a networked computer system for providing a casino patron loyalty program is provided. The networked computer system includes a promotions management computer server that is coupled to a plurality of player tracking servers. Each player tracking server is located at a different casino gaming property and is coupled to a plurality of gaming devices. Each player tracking server is configured to detect patron activity at the gaming devices and transmit data indicating the patron activity to the promotions management computer server. The promotions management computer server includes a processor programmed to execute an algorithm including the steps of receiving a gaming request signal from a player tracking server indicating a request from a patron to initiate a gaming session at a corresponding gaming device and displaying a gaming charm selection screen on the gaming device prompting the patron to select a gaming charm to associate with the gaming session. The gaming request signal includes a patron ID associated with the patron, a device ID associated with the corresponding gaming device, and a session ID associated with the gaming session. The processor is programed to receive a patron selected gaming charm and responsively generate an escrowed award record in an award escrow data file. The escrowed award record including the session ID, the patron ID, the device ID, and a charm ID associated with the patron selected gaming charm. The processor is programmed to detect a triggering event and responsively randomly selecting a promotional award charm ID from a charm data file including a plurality of charm IDs, access the award escrow data file and identifying escrowed award records having charm IDs matching the selected promotional award charm ID, identify gaming devices having device IDs associated with the identified escrowed award records, and display a bonus game on each identified gaming device.

In another aspect of the present invention, a method of operating a networked computer system for providing a casino patron loyalty program is provided. The networked computer system includes a promotions management computer server that is coupled to a plurality of player tracking servers. Each player tracking server is located at a different casino gaming property and is coupled to a plurality of gaming devices. Each player tracking server is configured to detect patron activity at the gaming devices and transmit data indicating the patron activity to the promotions management computer server. The method includes a processor of a promotions management computer server performing an algorithm including the steps of receiving a gaming request signal from a player tracking server indicating a request from a patron to initiate a gaming session at a corresponding gaming device and displaying a gaming charm selection screen on the gaming device prompting the patron to select a gaming charm to associate with the gaming session. The gaming request signal includes a patron ID associated with the patron, a device ID associated with the corresponding gaming device, and a session ID associated with the gaming session. The processor is programed to receive a patron selected gaming charm and responsively generate an escrowed award record in an award escrow data file. The escrowed award record including the session ID, the patron ID, the device ID, and a charm ID associated with the patron selected gaming charm. The processor is programmed to detect a triggering event and responsively randomly selecting a promotional award charm ID from a charm data file including a plurality of charm IDs, access the award escrow data file and identifying escrowed award records having charm IDs matching the selected promotional award charm ID, identify gaming devices having device IDs associated with the identified escrowed award records, and display a bonus game on each identified gaming device.

In yet another aspect of the present invention, one or more non-transitory computer-readable storage media, having computer-executable instructions embodied thereon to operate a networked computer system for providing a casino patron loyalty program. The computer-executable instructions cause a processor to perform an algorithm including the steps of receiving a gaming request signal from a player tracking server indicating a request from a patron to initiate a gaming session at a corresponding gaming device and displaying a gaming charm selection screen on the gaming device prompting the patron to select a gaming charm to associate with the gaming session. The gaming request signal includes a patron ID associated with the patron, a device ID associated with the corresponding gaming device, and a session ID associated with the gaming session. The processor is programed to receive a patron selected gaming charm and responsively generate an escrowed award record in an award escrow data file. The escrowed award record including the session ID, the patron ID, the device ID, and a charm ID associated with the patron selected gaming charm. The processor is programmed to detect a triggering event and responsively randomly selecting a promotional award charm ID from a charm data file including a plurality of charm IDs, access the award escrow data file and identifying escrowed award records having charm IDs matching the selected promotional award charm ID, identify gaming devices having device IDs associated with the identified escrowed award records, and display a bonus game on each identified gaming device.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 7-15 are illustrations of exemplary data files generated by the server computer shown in FIG. 2, according to embodiments of the present invention;

Figures 20A, 20B, 20C, 20D, 20E, 20F:
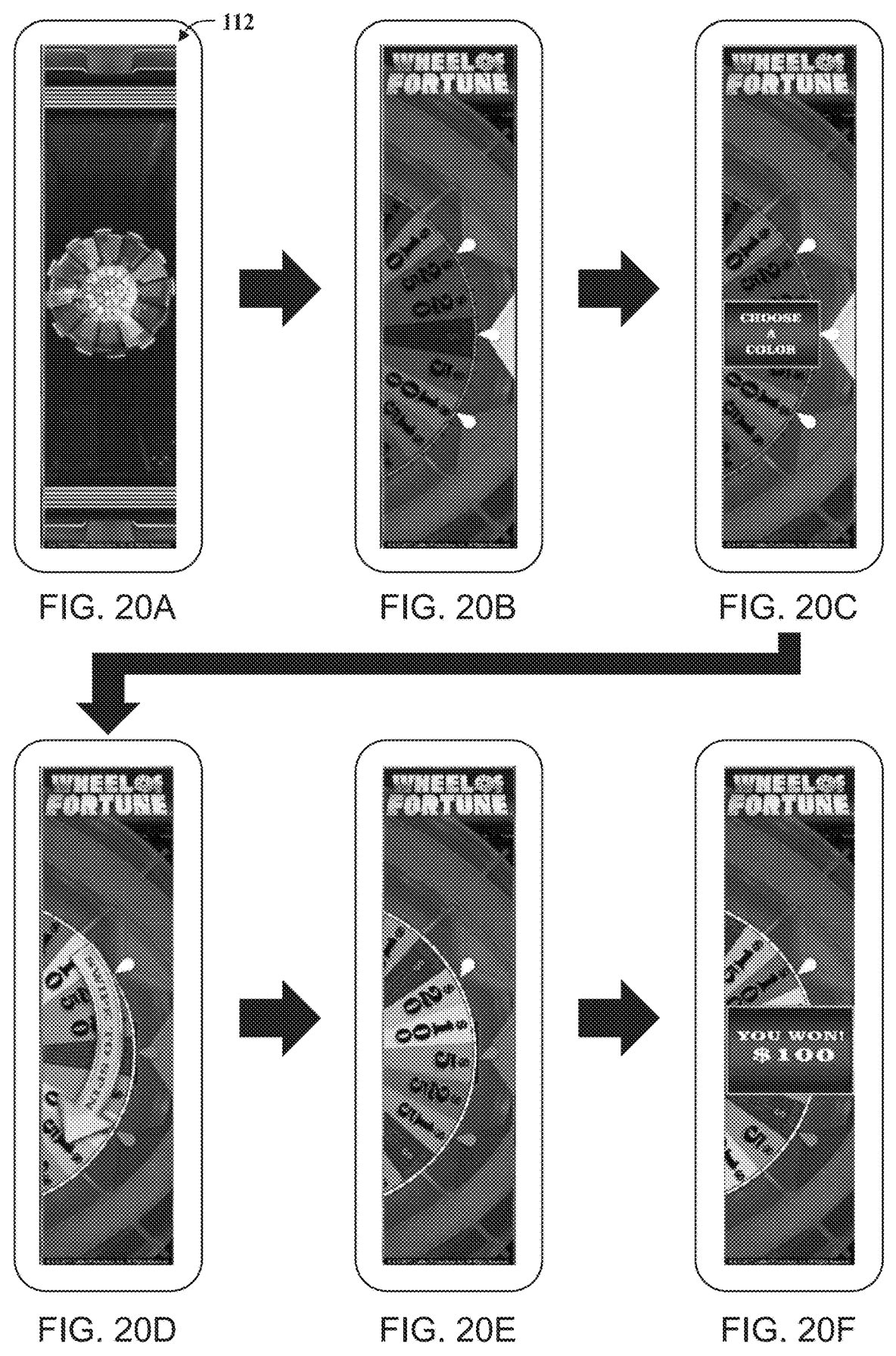

FIGS. 20A-20F are illustrations of a sequence of graphical computer images displaying an award notification game that may be displayed on the electronic gaming machine.

Figure 1:
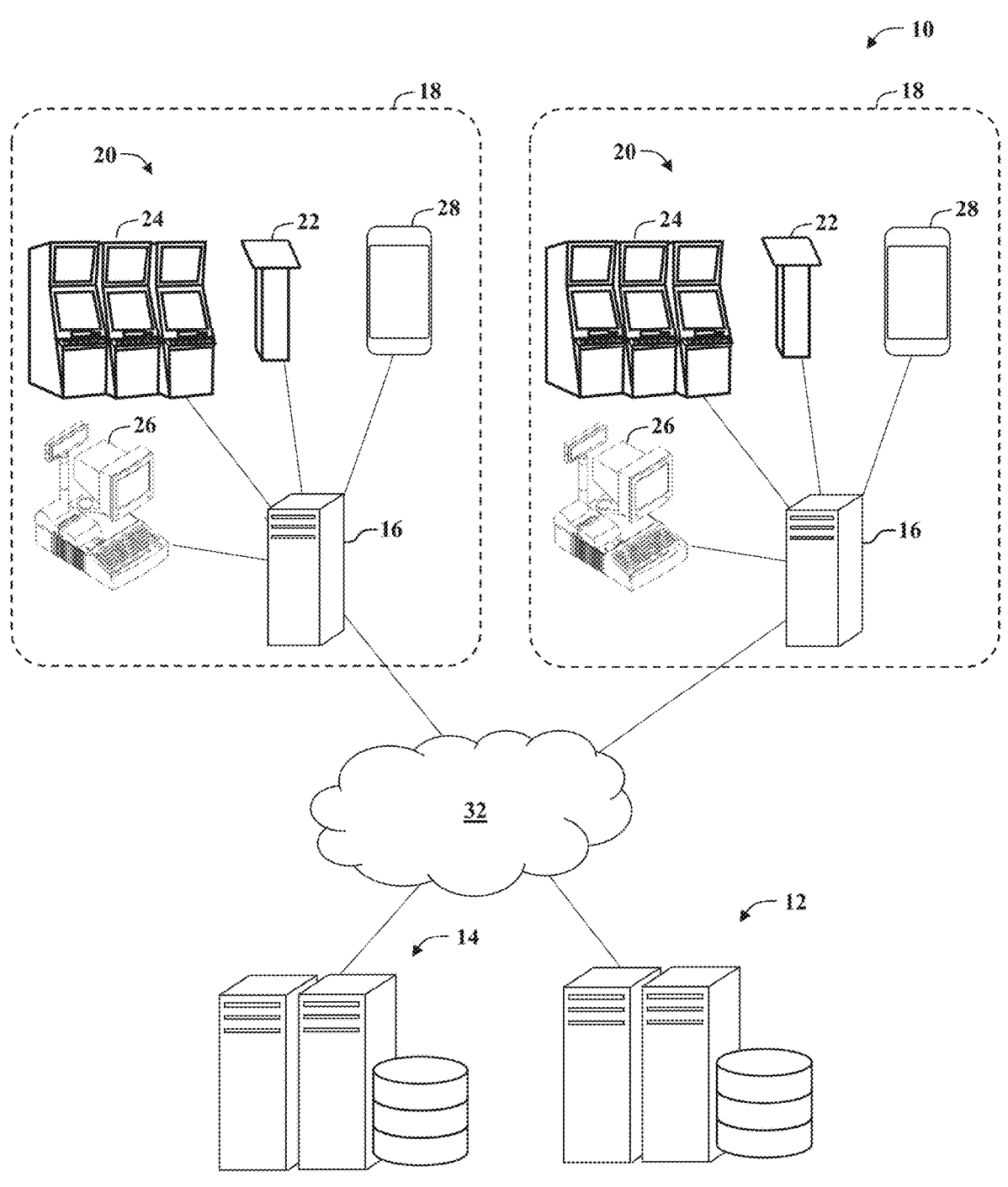
FIG. 1 is a schematic illustrating various aspects of a networked computer system for managing casino properties, according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

With reference to the FIGS. and in operation, the present invention provides a networked computer system, methods and computer product media that monitors the activities of casino patrons within multiple physical casino properties to provide random promotional awards to qualified casino patrons within the casino properties and provide simultaneous notifications of the promotional awards to each qualified patron at each casino property. The networked casino system also executes algorithms to implement the Random Celebration™ promotions such as, for example, the Wheel-of-Fortune™ Big Time Bonus™ promotional award program, and Luckiest Charm™ promotional award program provided by Station Casinos™ LLC. For example, when executing algorithms to implement the Random Celebration™ promotions and/or the Luckiest Charm™ promotional award program, the system allows patrons to select gaming charms to associate with a patron's gaming session, randomly selects a promotional award charm and provides promotional awards to each patron having a patron selected gaming charm matching the randomly selected promotional award charm. The gaming charm may be, for example, an image of a character, an avatar, a coin, an object, an action, a building, a location, and/or any suitable computer-generated image.

Referring to FIG. 1, an exemplary environment in which the networked computer system 10 operates is illustrated. In general, the present invention describes a networked computer system 10 for use in managing promotional awards across multiple casino properties and providing simultaneous notifications to patrons receiving promotional awards at each of the casino property locations. The system 10 initiates a promotional award period and monitors the gaming and purchasing activities of casino patrons as the patrons are physically located within a casino property to detect qualifying gaming and purchasing activities performed by patrons that qualify the patron for a promotional award. Upon detecting a qualifying promotional event performed by a patron, the system 10 randomly selects a promotional award and associates the randomly selected promotional award with the patron by generating an encrypted escrow account that includes information associated with the patron and the randomly selected promotional award. In addition, the escrowed award record includes a modifiable qualification flag that can be modified to indicate a qualified and unqualified state. The escrowed award record is included in an award escrow data file stored in a database. The system 10 allows patrons to select gaming charms to associated with a patron's gaming session at a gaming device and generates the escrowed award record to include a charm ID associated with the patron selected gaming charm. During the promotional award period, the system 10 continues to monitor the activities of the patron and modifies the qualification flag to the unqualified state upon detecting a disqualification activity performed by the patron.

The system 10 also detects a randomly occurring promotional award trigger event during the promotional period. Upon detecting the promotional award trigger event, the system 10 randomly selects a promotional award charm ID from a charm data file including a plurality of charm IDs, accesses the award escrow data file, and identifies escrowed award records having charm IDs matching the selected promotional award charm ID. The system 10 also identifies gaming devices associated with the identified escrowed award records having matching charm IDs, and displays a bonus game on each identified gaming device. In addition, for each identified escrowed award records having matching charm IDs, the system 10 may also identify those escrowed award records having the qualification flag in the qualified state, generate a notification message associated with each qualified escrow record including the corresponding promotional award, and transmit the notification messages to each patron associated with a qualified escrow account at each of the physical casino property locations. The system 10 accesses patron accounts associated with patrons receiving a promotional award and modifies the corresponding patron account to provide the promotional award to the patron.

The system 10 improves existing casino management systems by generating escrow account data files that include information that allows the system to associate randomly selected promotional awards to qualifying patrons before the promotional awards are provided and/or awarded to the patrons. Because the promotional awards are assigned to the patrons before the award trigger event has been detected, the amount of time and computer resources required to generate and transmit the award notification messages to the patrons is significantly reduced. In addition, the use of the escrow accounts enables the system 10 to simultaneously transmit award notifications to devices located at multiple casino properties, and enable a promotional award to occur simultaneously at each casino property. Moreover, the escrow accounts enables the system 10 to determine a total amount of promotional awards that may be awarded at any time during the promotional period.

In general, the system 10 is programmed to execute algorithms to implement a Random Celebration™ promotion that awards qualified players a prize when a configured Trigger Event Occurs. For example, in one embodiment, the system 10 is programmed to execute the Wheel-of-Fortune™ Big Time Bonus™ promotional award programmed and/or the Luckiest Charm™ promotional award program offered by Station Casinos™ LLC. Only Players that have an active qualified session at the time of the event receive the prize. Awards are randomly selected from a weighted list of prizes. Different patron segments can be configured to allow for different prize configurations which get assigned to one or more marketing customer segmentations.

The system 10 is programmed to implement Flexible Event Triggers including, for example, 3rd Party Bonus Event such as Carded Lucky Coin; Random Selected card in event that hits play level; and/or Random Time Event. The system 10 may also be programmed to implement Patron Qualified Sessions that includes any type of session a player has can be used for the promotion including, for example, Carded Session on a Gaming Machine; Carded Session on a Table Game; Carded Session on a Kiosk; and/or Authenticated Session on a Mobile Device.

Patron Qualifications may include examples including a single or combination of the following: Player belongs to a specific Marketing List (group); Player Plays a Pre-determined level of play; Player begins session on a game that is qualified; Player begins session during a qualified date/time range; Player begins session at a property that is qualified; and/or Player is activity playing for a Pre-determined length of time.

During operation, the system selects a prize at the start of a qualified session to allow for maximum scalability across large number of machines and properties. For example, once a player becomes qualified for a given random celebration promotion, the player's prize is determined and securely escrowed at the time the qualifying event is detected, and will be awarded if the trigger event is hit. All prizes are encrypted and stored within a data store. If the player becomes unqualified before the trigger event, the record becomes unqualified but the system retains a history of all the qualifying sessions throughout the promotion period. Liability can be determined at any given point in time for all qualified players.

The system 10 also executes a Prize Delivery/Notification algorithm including, for example, when the qualified trigger event occurs all qualified players are immediately notified of their prize. Notification can occur as a Promotional Game on the Game Screen, a text message and or notification on their mobile device.

For clarity in discussing the various functions of the system 10, multiple computers and/or servers are discussed as performing different functions. These different computers (or servers) may, however, be implemented in multiple different ways such as modules within a single computer, as nodes of a computer system, etc., The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a promotions management computer server 12 that is coupled in communication with a casino management system server 14 and a plurality of player tracking servers 16 located at a plurality of casino property locations 18. The promotions management computer server 12 communicates with the casino management system server 14 and the player tracking servers 16 and executes algorithms to implement the Random Celebration™ promotions such as, for example, the Wheel-of-Fortune™ Big Time Bonus™ promotional award program and/or the Luckiest Charm™ promotional award program. Each player tracking server 16 is coupled in communication with a plurality of gaming devices 20 that are located at a corresponding casino property 18 and are accessible by casino patrons to purchase goods and services provided by the casino property. Each server may include one or more server computers that each include a processing device that includes a processor that is coupled to a memory device. The processing device executes various programs, and thereby controls components of the server according to user instructions received from the gaming devices 20 and/or other servers. The processing device may include memory, e.g., read only memory (ROM) and random access memory (RAM), storing processor-executable instructions and one or more processors that execute the processor-executable instructions.

In the illustrated embodiment, the plurality of gaming devices 20 includes kiosks 22, electronic gaming machines (EGM) 24, a point-of-sale (POS) terminals 26, and user/patron computing devices 28. The player tracking servers 16 monitor the purchases and activities of patrons and transmits the information to the promotions management computer server 12. The casino management system server 14 generates and maintains patron account records 30 (shown in FIG. 7) associated with each patron that includes information associated with the purchase and activities of patrons being monitored by the player tracking servers 16, which are then used to award promotional points to patrons that may be used to purchase additional goods and services from the casino properties. For example, the player tracking servers 16 are configured to tracking patrons wagering activity and game play on electronic gaming machines, table games and other gaming revenue areas such as, bingo, keno, and sports wagering. In addition, the player tracking servers 16 are configured to monitor patron purchases of casino property services such as restaurant, spa services, merchandise, hotel rooms, and amenity services through non-gaming revenue POS terminals 26 and/or kiosks 22. Moreover, the player tracking servers 16 may be configured to monitor patron purchases and activities accessed using user computer software applications such as mobile software applications executed on mobile computing devices and/or websites. In some embodiments, the player tracking servers 16 and/or the casino management system server 14 identifies patrons using patron tracking ID cards and/or a patron identification numbers (PIN) that are linked to the patron account records 30. The casino management system server 14 tracks the patron's gaming play and may award patron tracking points, bonuses, and other incentives according to established criteria to promote continued patron loyalty. For example, in one embodiment, the casino management system server 14 may be configured to implement the myBoardingPass™ player rewards program offered by Station Casinos™.

The gaming devices 20, casino management system server 14, player tracking servers 16, and promotions management computer server 12 communicate via a communications network 32. The communications network 32 may be any suitable connection, including the Internet, file transfer protocol (FTP), an Intranet, LAN, a virtual private network (VPN), cellular networks, etc. . . . , and may utilize any suitable or combination of technologies including, but not limited to, wired and wireless connections, always on connections, connections made periodically, and connections made as needed.

In the illustrated embodiment, each user/patron computing device 28 includes a display device and a processing device that includes a processor that is coupled to a memory device. The processing device executes various programs, and thereby controls components of the computing device according to user instructions received by the user to enable the user to access and communicate with the system 10 including sending and/or receiving information to and from the system 10 and displaying information received from the system 10 to the user.

For example, in some embodiments, the user computing device 28 may include, but is not limited to, a desktop computer, a laptop or notebook computer, a tablet computer, smartphone/tablet computer hybrid, a personal data assistant, a handheld mobile device including a cellular telephone, and the like. In addition, the user computing device 28 may include a touchscreen that operates as the display device and the user input device. In the illustrated embodiment, the user computing device 28 includes a web-browser program that is stored in the memory device. When executed by the processor of the user computing device, the web-browser program enables the user computing device to receive software code from the system 10 including, but not limited to, HTML, JavaScript, and/or any suitable programming code that enables the user computing device to generate and display a website and/or webpages on the display device of the user computing device.

Similarly, kiosks 22 may include a touchscreen display and processor for executing web-browser programs to receive software code from the system 10 and display a website and/or webpages on the touchscreen display. In addition, the kiosks 22 may also include a card reader device for obtaining patron ID's stored on the physical patron tracking ID cards.

In one embodiment, the user computing device 28 may include a mobile computing device such as, for example, a tablet computer, a smartphone/tablet computer hybrid, a smartphone such as an iPhone™, Samsung Galaxy™, and the like. The mobile computing device includes a processor coupled to a memory device for storing various programs and data for use in operating the mobile computing device. The mobile computing device may also include a touchscreen display unit, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device may also include a Wi-Fi antenna, a cellular network antenna, a Bluetooth™ communications device, assisted GPS and GLONASS, a digital compass, and an iBeacon™ microlocation device. The mobile computing device may be programmed to store and execute mobile computer program applications that display graphical user interfaces on the touchscreen display unit that allows the user to access the system 10 to retrieve and store information within the system 10 as well as interact with and operate the system 10. For example, the system 10 may be configured to implement a mobile application such as, for example, the "STN™" mobile application offered by Station Casinos™ available in Apple iOS™, Google Android™, and Amazon Kindle™ operating platforms, or on social-media websites such as Facebook™.

In some embodiments, the POS terminal 26 includes a computer processor, a monitor (e.g., a cashier-facing monitor), one or more input devices (e.g., scanners, keyboards, scales, or the like), one or more payment devices (e.g., cash drawers, card readers) for receiving or returning payments, one or more output devices (e.g., customer-facing display monitor, receipt printer), or the like or combinations or sub-combinations thereof, and a near field communication (NFC) device, such as, for example, an NFC dongle. The input devices and payment devices can feed data and commands to computer processor for processing or implementation. For example, a barcode scanner can pass data communicating the identity of one or more items to be purchased, returned, or the like to a computer processor. Similarly, a card reader can pass payment information and/or patron ID information to the computer processor. Similarly, customer-facing display and receipt printer can display or output data or information as instructed by the computer processor.

The electronic gaming machine (EGM) 24 includes a gaming cabinet that houses a display device and a gaming controller that includes one or more gaming computer processors for generating and displaying a plurality of games on the display device. The gaming computer processor executes a wagering game program that uses a random number generator to randomly generate outcomes of the games, which allows a player to make a wager, play a game, and potentially provide the player an award based on an outcome of the game and a paytable. For example, in some embodiments, the EGM 24 executes a video slot machine that executes a game including a plurality of video reels displaying game symbols. The EGM 24 may also execute any type of game including, but not limited to, a video slot game, a keno game, a blackjack game, a video poker game, or any type of game which allows a player to make a wager and potentially provide the player an award.

In some embodiments, the EGM 24 includes a user input device that includes a plurality of input buttons and an acceptor device that includes a coin slot and/or a bill acceptor. The acceptor device includes an input and output device that is configured to accept a bill, a ticket, and/or a cash card into the acceptor device to enable an amount of gaming credits associated with a monetary value of the bills, ticket, and/or cash card to be credited to the gaming device. For example, the acceptor device may utilize a cashless wagering system (not shown), such as a ticket in ticket out (TITO) system (not shown). The EGM 24 may also include a player tracking device that communicates with the player tracking server 16. The player tracking device includes a player identification card reader and a display. The player identification card reader is configured to accept a player tracking ID card inserted by the player, and read information contained on the player tracking card to identify the player account information. The player identification card reader may include, but is not limited to, a barcode reader, a magnetic card reader, and/or a radio frequency identification (RFID) card reader. The display device may include a touchscreen panel that includes a keypad to allow the player to enter a unique PIN that is used by the player tracking server 16 to identify the patron and the corresponding patron tracking account. The player tracking device is configured to communicate player account information and gaming activity between the player tracking server 16 and the EGM gaming controller. For example, the player tracking device may be used to track bonus points and/or credits awarded to the player during a gaming session and/or track bonus and/or credits downloaded to the EGM 24 from the player tracking server 16.

Figure 2:
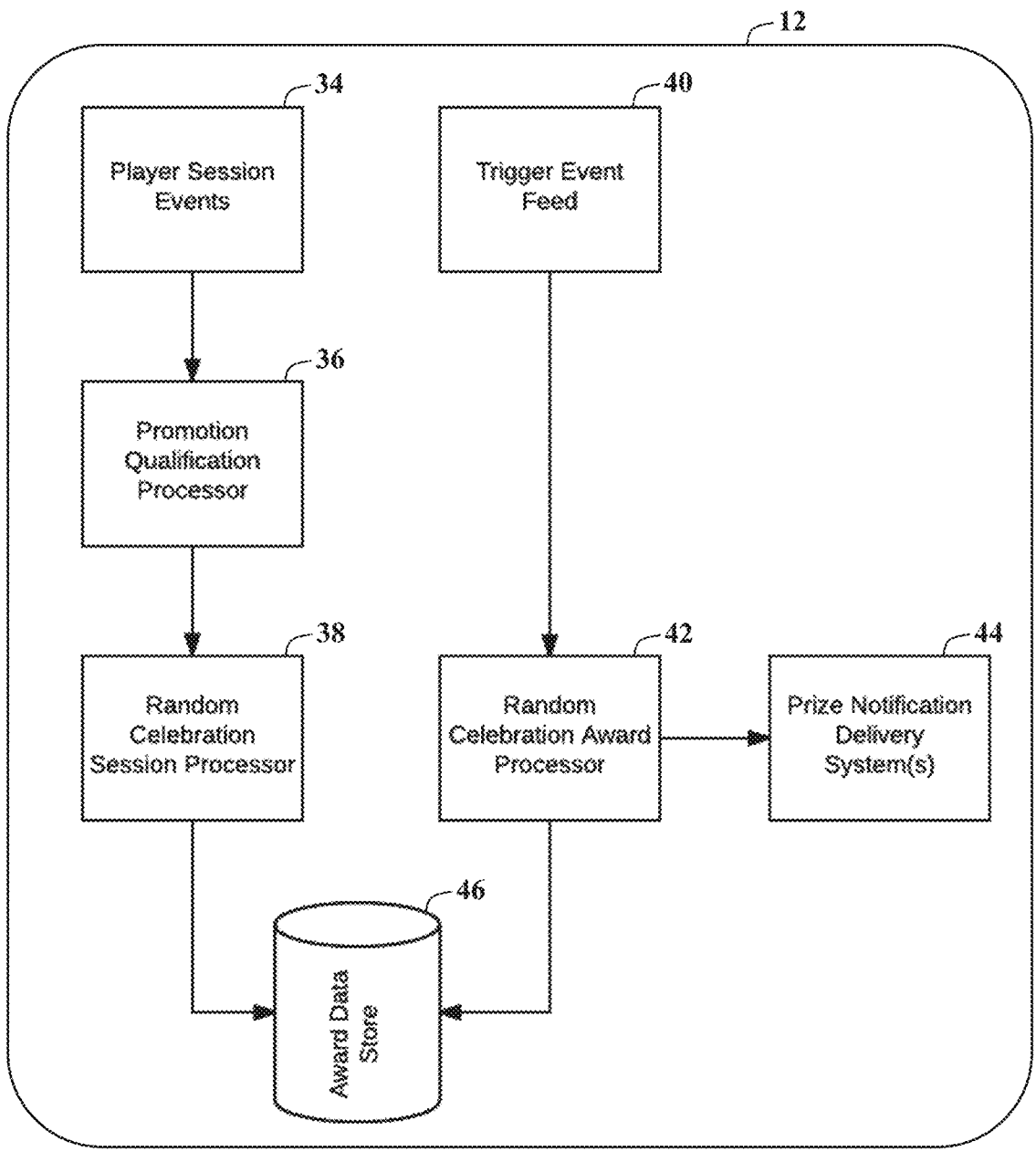
FIG. 2 is a schematic illustrating example components of a server computer that may be used with the system shown in FIG. 1, according to an embodiment of the present invention.

FIG. 2 is a schematic illustrating example components of the promotions management computer server 12. FIGS. 3-6 are flowcharts illustrating the algorithms 200, 300, 400, and 500 executed by the promotions management computer server 12. The methods include a plurality of steps. Each method step may be performed independently of, or in combination with, other method steps. Portions of the methods may be performed by any one of, or any combination of, the components of the system 10. The promotions management computer server 12 includes one or more processors that are programmed to execute the algorithms shown in FIGS. 3-6, and 15-20F, and described herein. For example, in the illustrated embodiment, the promotions management computer server 12 includes a player session events processor 34, a promotion qualification processor 36, and random celebration session processor 38, a trigger event feed processor 40, a random celebration award processor 42, a prize notification delivery system processor 44, and an award data store 46.

The award data store 46 includes a memory device that is connected to a database to retrieve and store information contained in the database. In one embodiment, the award data store 46 maintains a promotional award selection file 48 (shown in FIGS. 8-9) that includes information associated with a plurality of promotional awards such as, for example, a plurality of promotional award values and corresponding selection probabilities associated with each promotional award value. In addition, promotional award selection file 48 may include a plurality of tiered groups 50 that include promotional awards associated with various player card levels. In one embodiment, the promotional award selection file 48 may also include a plurality of promotional award paytables 52, 54, 56 including a plurality of awards (shown in FIG. 9). In one embodiment, the plurality of promotional award paytables may include including a high-value award paytable 52, medium-value award paytable 54, and a low-value award paytable 56. The high-value award paytable 52 includes awards having a higher monetary value than awards included in the medium-value award paytable 54, and the low-value award paytable 56. The medium-value award paytable 54 includes awards having a higher monetary value than awards included in the low-value award paytable 56. In general, the term "award" may be a payout, in terms of gaming credits or money. However, it should be understood that the term award may also refer to other types of awards, including, prizes, e.g., meals, show tickets, etc. . . . , as well as in-game awards, such as free games.

The award data store 46 also maintains a charm data file 58 and a charm accessories file 60 (shown in FIGS. 10 and 11). The charm data file 58 includes information and data for use in generating gaming charms 62 and a gaming charm selection screen 64 (shown in FIG. 16) that may be used by a patron to select one or more gaming charms 62 for use during a gaming session. For example, the charm data file 58 may include a plurality of gaming charm data records 66 associated with gaming charms 62. Each gaming charm data record 66 includes information associated with a corresponding gaming charm 62 including a charm ID 68 and charm image object data for use in generating computer images of the corresponding gaming charm 62. Gaming charm data records 66 may also include data indicating an associated patron card/tier level 50, a promotional point value 70, and a selection probability 72. The patron card/tier level 50 indicates gaming charms 62 associated with various player card/tier levels. The promotional point value 70 indicates an amount of promotional points a patron may use to purchase a corresponding gaming charm 62. The selection probability 72 indicates a probability the gaming charm 62 may be selected during a promotional award event.

The charm accessories file 60 includes information and data for use in generating charm accessories 74 that may be used with gaming charms 62 and a charm accessory selection screen 76 (shown in FIG. 17) that may be used by a patron to select one or more charm accessories 74 that may be used with a gaming charm 62. The charm accessory selection screen 76 may include, for example, a patron selected gaming charm 78 and a plurality of charm accessories 74 that may be selected by the patron 79 for use with the patron selected gaming charm 78. The image of the patron selected gaming charm 78 may be modified to include one or more charm accessories 74 after the patron has selected the corresponding charm accessory 74. For example, the charm accessories file 60 may include a plurality of charm accessory data records 80 associated with gaming charms 62. Each charm accessory data record 80 includes information associated with charm accessories 74 including a corresponding charm ID 68, and accessory ID 82, and accessory image object data for use in generating computer images of the corresponding charm accessory 74 and gaming charm 62 including the charm accessory 74. Charm accessories 74 may include, but are not limited to, images, objects, characters, actions, emotes, movements, skins, and/or any suitable computer-generated images that may be used to enhance and/or change a visual appearance of a gaming charm 62. Charm accessory data records 80 may also include data associated with a promotional point value 70 indicating an amount of promotional points a patron may use to purchase a corresponding charm accessory 74 for use with a gaming charm 62.

Figure 3:
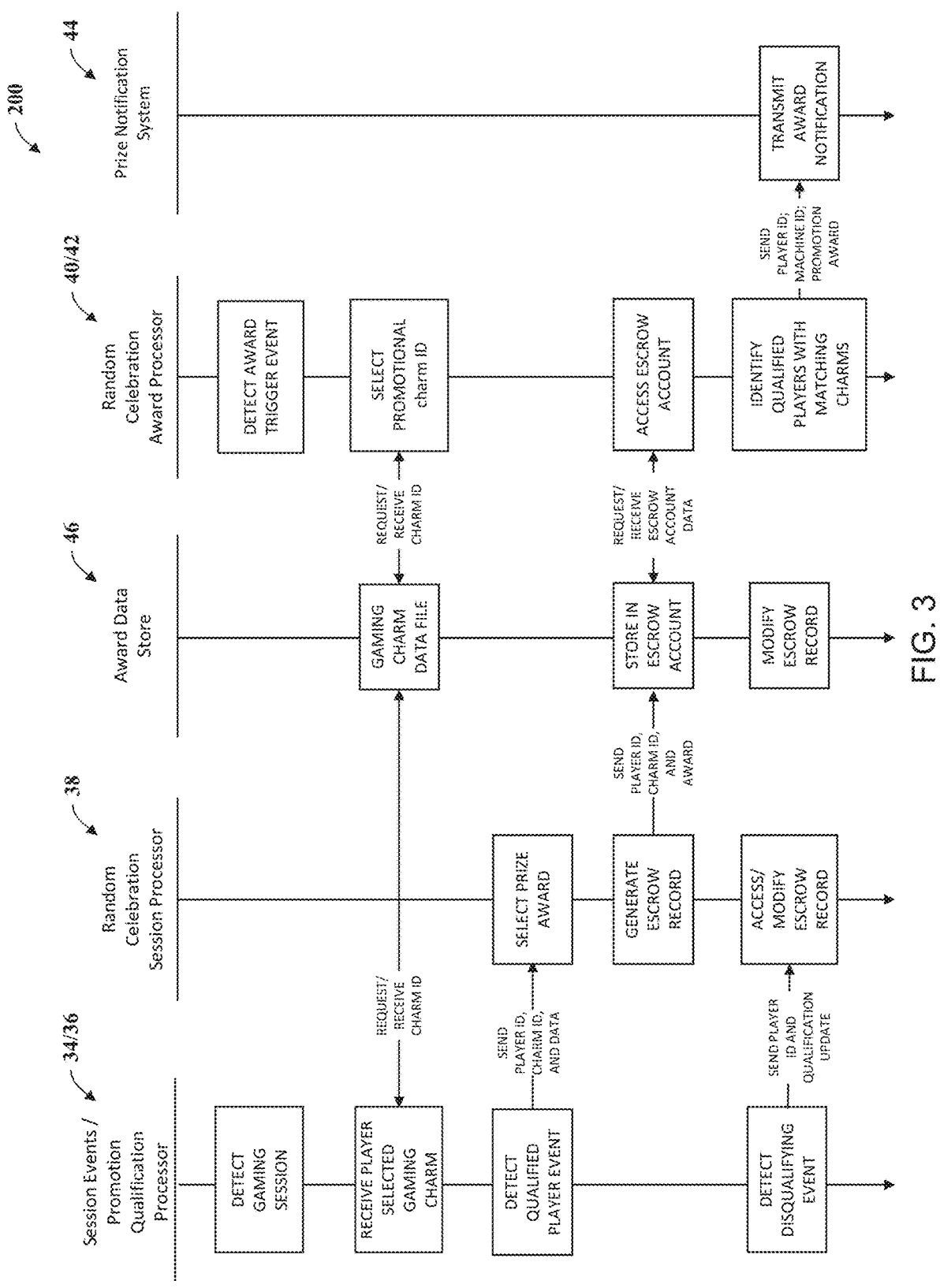
FIGS. 3-6 are flowcharts illustrating the algorithms executed by the server computer shown in FIG. 2, according to embodiments of the present invention.

Referring to FIGS. 1, 2, and 3, the player session events processor 34 is programmed to communicate with the player tracking servers 16 to receive information associated with patron activities within the casino properties 18. In the illustrated embodiment, each player tracking server 16 detects an activity being performed by a patron using a patron tracking ID card and transmits information associated with the patron activity to the player session events processor 34. For example, in one embodiment, a player tracking server 16 may receive a signal from an EGM 24 indicating a player logging into their player tracking account by inserting a patron tracking ID card into a player tracking device and inputting a corresponding player PIN. Upon receiving a signal from an EGM 24 indicating a player logging into their player tracking account, the player tracking server 16 may also transmit an initial gaming request signal to the player session events processor 34 indicating a request from a patron to initiate a gaming session at a corresponding gaming device. The gaming request signal may include a patron activity data file 84 including a Patron ID 86 received from patron tracking ID card, an activity session ID 88, a device ID 90 associated with the EGM 24, and/or a property ID 92 indicating the corresponding casino property 18.

Upon receiving the initial gaming request signal, the player session events processor 34 may cause the gaming charm selection screen 64 (shown in FIG. 16) to be displayed on the corresponding gaming device 20 prompting the patron 79 to select a gaming charm 62 to associate with the gaming session. The gaming charm selection screen 64 may include for example, a plurality of gaming charms 62 that may be selected by the patron 79 and a current patron selected gaming charm 62. For example, in one embodiment, the player session events processor 34 may transmit a patron account record request to the casino management system server 14 to retrieve information included in a patron account record 30 associated with the received patron ID 86. The patron account record 30 may include, for example, charm IDs 68 indicating available gaming charms 94 associated with the patron such as, for example, gaming charms 62 previously selected by the patron, previously purchased by the patron, awarded to the patron as a promotional award, and/or otherwise available for patron selection. The patron account record 30 may also include accessory IDs 82 indicating available charm accessories 96 associated with available gaming charms 94 such as, for example, charm accessories 74 previously selected by the patron, previously purchased by the patron, awarded to the patron as a promotional award, and/or otherwise available for patron selection.

The player session events processor 34 then retrieves a patron account record 30 associated with the received patron ID 86, determines the charm IDs 68 included in the retrieved patron account record 30, retrieves image object data and information associated with the charm IDs 68 from the charm data file 58 and displays the gaming charm selection screen 64 including the available gaming charms 94 associated with the charm IDs 68 included in the retrieved patron account record 30. The player session events processor 34 may also access the charm data file 58 to retrieve image object data and information associated with other gaming charms 98 that are currently unavailable for selection by the patron such as, for example, gaming charms 62 having charm IDs 68 that are not included in the retrieved patron account record 30, gaming charms 62 that have not been previously purchased by and/or awarded to the patron. For example, in one embodiment, the player session events processor 34 may access the charm data file 58 to retrieve image object data and information indicating gaming charms 62 having a patron card/tier level 50 matching the card/tier level included in the patron account record 30, and display the other gaming charms 98 in the gaming charm selection screen 64. For example, in one embodiment, the player session events processor 34 may display a plurality of gaming charms 62 on the gaming charm selection screen 64 including the available gaming charms 94 associated with the charm IDs 68 included in the retrieved patron account record 30 and unavailable gaming charms 98. The player session events processor 34 may also highlight images of the available gaming charms 94 on the gaming charm selection screen 64 to indicate the displayed gaming charms 62 that are available for selection by the patron 79.

The player session events processor 34 may also access the charm data file 58 to determine the promotional points required to purchase the unavailable gaming charms 98, and display one or more unavailable gaming charms 98 with a corresponding amount of promotional points to purchase a corresponding unavailable gaming charm. In one embodiment, upon receiving a patron selection of an unavailable gaming charm 98 from the gaming charm selection screen 64, the player session events processor 34 may transmit a purchase request signal to the casino management system server 14 including an charm ID and promotional point value associated with the patron selected unavailable gaming charm 98. The casino management system server 14 may then modify the patron account record 30 to include the received charm ID 68 and modify a balance or promotional points included in the patron account record 30 indicating a purchase of the patron selected unavailable gaming charm 98. Upon receiving a verification of the purchase of the patron selected unavailable gaming charm 98 from the casino management system server 14, the player session events processor 34 may then modify the image of the gaming charm 62 to indicate that the gaming charm 62 is now an available gaming charm 94 associated with the charm IDs 68 included in the patron account record 30, and highlight the image of the available gaming charm 94 to indicate the gaming charm 62 is now available for selection by the patron 79.

In one embodiment, player session events processor 34 may also display the charm accessory selection screen 76 upon receiving a signal indicating the patron's selection of a gaming charm 62 to prompt the patron to select one or more charm accessories 74 for use with the selected gaming charm 62. For example, upon receiving a signal indicating the patron selected gaming charm 78, the player session events processor 34 may access the charm accessories file 60 including information indicating a plurality of charm accessories associated with each gaming charm, and identify charm accessories 74 associated with the patron selected gaming charm 78. The player session events processor 34 may, for example, determine the charm ID 68 associated with the gaming charm 62 selected by the patron via the gaming charm selection screen 64, access the charm accessories file 60 to identify the charm accessory IDs 82 associated with the patron selected charm ID 68, retrieve image object data and information associated with the identified charm accessory IDs 82 from the charm accessories file 60, and display the charm accessory selection screen 76 including the charm accessories 74 associated with the identified charm accessory IDs 82.

In some embodiments, the player session events processor 34 may also access the patron account record 30 to identify the charm accessory IDs 82 included in the retrieved patron account record 30 and associated with the patron selected charm ID 68, retrieve image object data and information associated with the identified charm accessory IDs 82 from the charm accessories file 60, and display the charm accessory selection screen 76 including the available charm accessories 96 associated with the identified charm accessory IDs 82 included in the retrieved patron account record 30.

The player session events processor 34 may also access the charm accessories file 60 to retrieve image object data and information associated with other charm accessories 100 that are associated with the patron selected charm ID 68 and currently unavailable for selection by the patron such as, for example, charm accessories 74 having charm accessory IDs 82 that are not included in the retrieved patron account record 30, and/or charm accessories 74 that have not been previously purchased by and/or awarded to the patron.

For example, in one embodiment, the player session events processor 34 may access the charm accessories file 60 to retrieve image object data and information indicating charm accessories 74 associated with the patron selected gaming charm 78, and display the unavailable charm accessories 100 in the charm accessory selection screen 76. For example, in one embodiment, the player session events processor 34 may display a plurality of charm accessories 74 associated with the patron selected gaming charm 78 on the charm accessory selection screen 76 including the available charm accessories 96 associated with the charm accessory IDs 82 included in the retrieved patron account record 30 and unavailable gaming charms 98 indicating other charm accessory IDs that are associated with the patron selected gaming charm 78 but are not included in the retrieved patron account record 30. The player session events processor 34 may also highlight images of the available charm accessories 96 on the charm accessory selection screen 76 to indicate the displayed charm accessories 74 that are available for selection by the patron 79.

The player session events processor 34 may also access the charm accessories file 60 to determine the promotional points required to purchase the unavailable charm accessories 100, and display one or more unavailable charm accessories 100 with a corresponding amount of promotional points to purchase a corresponding unavailable charm accessory. In one embodiment, upon receiving a patron selection of an unavailable charm accessory 100 from the charm accessory selection screen 76, the player session events processor 34 may transmit a purchase request signal to the casino management system server 14 including a charm accessory ID and promotional point value associated with the patron selected unavailable charm accessory 100. The casino management system server 14 may then modify the patron account record 30 to include the received charm accessory ID 82 and modify a balance or promotional points included in the patron account record 30 indicating a purchase of the patron selected unavailable charm accessory 100. Upon receiving a verification of the purchase of the patron selected unavailable charm accessory 100 from the casino management system server 14, the player session events processor 34 may then modify the image of the charm accessory 74 to indicate that the charm accessory 74 is now an available charm accessory 96 associated with the charm accessory IDs 82 included in the patron account record 30, and highlight the image of the available charm accessory 96 to indicate the charm accessory 74 is now available for selection by the patron 79.

In some embodiments, upon receiving a patron's selection of a gaming charm 62 and/or one or more charm accessories 74, the player session events processor 34 may generate instructions including image object data that causes the corresponding gaming device 20 to display a game screen 102 (shown in FIG. 18) that includes images of the patron selected gaming charm 78 and/or one or more charm accessories 74, and transmit the generated instructions including the charm ID 68 associated with the patron selected gaming charm 78 to the player tracking server 16 for use in generating and/or modifying the patron activity data file 84 to include the patron selected charm ID 68.

In some embodiments, the player tracking server 16 may monitor patron wagering activity at the EGM 24 and transmit information associated with the monitored patron wagering activity to promotions management computer server 12. In one embodiment, for example, the player tracking server 16 may transmit the patron activity data file 84 associated with the monitored patron activity including the patron ID 86 received from patron tracking ID card, the activity session ID 88 associated with the gaming session, the device ID 90 associated with the EGM 24, the property ID 92 indicating the corresponding casino property 18, the charm ID 68 associated with the patron selected gaming charm 78 and information associated with the wagering activity such as, for example, an amount of time at the EGM and/or an amount wagered over time. In another example, the player tracking server 16 may detect patron activities including accessing a kiosk 22 or mobile application via a mobile computing device, and/or purchasing goods and/or services via a POS terminal 26, and transmit information associated with the monitored patron activity to the promotions management computer server 12.

The promotion qualification processor 36 receives the data associated with the monitored patron activity from the player session events processor 34 and determines whether the monitored patron activity is a qualifying promotional event or a disqualifying promotional event. For example, the promotion qualification processor 36 may generate and store one or more promotional event data files 104 in the award data store 46 with each promotional event data file 104 including information associated with a promotional event including a list of qualifying events 106, a list of disqualifying events 108, and a predefined period of time associated with promotional event. For each monitored patron activity received from the player session events processor 34, the promotion qualification processor 36 accesses the promotional event data files 104 to determine which promotions are currently active, and whether the monitored patron activity is a qualifying event or a disqualifying event associated with a currently active promotion. A qualifying event includes patron activities that qualifies the patron as being eligible to receive an award associated with the corresponding promotion. A disqualifying event includes patron activities that disqualify the patron from being eligible to receive an award associated with the corresponding promotion. For example, in one embodiment a promotion may include qualifying events such as a predefine level of play at a slot machine over a predefined period of time and include disqualifying event such as terminating play at the slot machine or waging less than the predefined level of play. The promotion qualification processor 36 then designates the monitored patron activity as either qualifying or disqualifying, and transmits information associated with the designated monitored patron activity to the random celebration session processor 38. In some embodiments, the promotion qualification processor 36 modifies the received patron activity data file 84 to generate a designated patron activity data file 84 that includes a qualification designation tag 110 and transmits the designated patron activity data file

84 to the random celebration session processor 38 that includes a qualification designation tag 110 indicating whether the patron activity data file 84 includes a qualifying or disqualifying activity.

The random celebration session processor 38 is configured to generate and store encrypted award escrow data files 112 (shown in FIGS. 14-15) based on the information associated with the designated patron activity data file 84 that is received from the promotion qualification processor 36. The award escrow data files 112 includes a plurality of escrowed award records 114 that are associated with a promotional award associated with a patron. In one embodiment, the escrowed award records 114 may include a Patron ID 86 associated with a patron, a unique activity session ID 88 associated with the patron activity, a device ID 90 associated with a corresponding patron computing device, a property ID 92 associated with a casino property 18, an charm ID 68 associate with a patron selected gaming charm 78 used during the gaming session and/or associated with the patron activity, a promotional prize award 116, a notification program file 118, and a qualification flag ID 120. The qualification flag ID 120 is modifiable to indicate a "qualified" status or a "unqualified" status. The notification program file 118 may include computer executable instructions for displaying notification images 122 (shown in FIGS. 19 and 20A-20F) and/or messages on the various gaming devices 20.

In one embodiment, as shown in FIG. 15, the random celebration session processor 38 is programmed to generate an escrowed award record 114 in JSON™ programming language including the Patron ID 86, the session ID 88, award fulfilment instructions 124 including the selected promotional award 116, the property ID 92, and the device ID 90, the charm ID 68 associate with a patron selected gaming charm 78, the notification program file 118 including corresponding messaging instructions 126 including an award notification message 122, and a corresponding qualification status indicator 92, i.e., the qualification flag ID, indicating a qualified status. For example, the escrowed award record 114 may include software code including primary contents: Routing code 128 for routing to the device and/or property; Prize Fulfillment code 130 including instructions for How the prize gets processed for the customer; Channel Display code 132 including instructions for How the delivery will be presented to the customer; and Award Source code 134 including instruction for determining the source that the prize originated from, e.g., a promotion hit Id.

In the illustrated embodiment, the random celebration session processor 38 is programmed to receive data associated with a designated patron activity data file 84 from the promotion qualification processor 36 and identify the designated patron activity data file 84 as being qualifying or disqualifying. Upon determining the designated patron activity data file 84 to be a qualifying activity, the random celebration session processor 38 accesses a promotional award selection file 48 being stored in the award data store 46, selects a promotional award using promotional award selection file 48, and generates an escrowed award record 114 to associate the selected promotional award to the patron.

For example, in one embodiment, the random celebration session processor 38 accesses the patron account records 30 using the patron ID associated with the designated patron activity data file 84 and determines a card tier level associated with the patron ID. The random celebration session processor 38 then accesses the award selection file 84, determines the tiered group 50 associated with the determined card tier level, and randomly selects a promotional award included in the determined tiered group.

In one embodiment, the random celebration session processor 38 may be programmed to determine an award liability value based on qualified escrowed award records include in the award escrow data file 112, and select a promotional award based on the determine award liability value. For example, as shown in FIG. 9, the award data store 46 may include the promotional award selection file 48 having the high-value award paytable 52, the medium-value award paytable 54, and the low-value award paytable 56. Each of the award paytables 52, 54, 56 may be associated with a different award liability value range. When generating the escrowed award record, the random celebration session processor 38 may be programmed to access the award escrow data file 112 and calculate the award liability value equal to a sum of the promotional awards included in escrowed award records having qualification status indicator indicating qualified status. The random celebration session processor 38 then identifies the award paytable having an award liability value range associated with the calculated award liability value, and randomly select a promotional award from the identified award paytable. For example, the random celebration session processor 38 may select the promotional award from the low-value award paytable 56 if the determined award liability value is greater than a predefined liability award liability value. In this manner, the random celebration session processor 38 may adjust subsequent award liability values, and thus adjust the total amount of promotional awards that may be awarded at any given time.

In the illustrated embodiment, upon selecting the promotional award, the random celebration session processor 38 generates a corresponding escrowed award record 114 including a qualification flag ID 120 identifying the corresponding escrowed award record as "qualified", and stores the corresponding escrowed award record in the award escrow data files 112. In addition, in one embodiment, the random celebration session processor 38 generates a notification program file 118 including instructions for displaying the notification sequence of images shown in FIGS. 20A-20F, and stores the notification program file with the corresponding escrowed award record. For example, the random celebration session processor 38 may determine a type of patron computing device based on the device ID included with designated patron activity data file 84 that is received from the promotion qualification processor 36, and generates and caches the notification program file 118 including instructions that are executable by the processing device of the corresponding patron computing device. For example, in one embodiment, the notification program file may include software code written in HTML and/or JavaScript for use in generating the notification sequence via webpages being displayed on the kiosk 22 or mobile computing device. In addition, the notification program file may include instruction for display a bonus wheel game (shown in FIGS. 20A-20F) that displays a bonus wheel on a display screen, such as, for example, an EGM display, and prompts the player to select a color and spin the wheel to reveal the promotional prize. In some embodiments, the notification program file includes the property ID and device ID.

In some embodiments, the random celebration session processor 38 may receive a designated patron activity data file 84 from the promotion qualification processor 36 indicating a disqualifying patron activity. Upon determining the designated patron activity data file 84 to be a disqualifying event, the random celebration session processor 38 accesses the award escrow data files 112 and selects an escrowed award record 114 that includes a Patron ID and/or activity session ID matching the Patron ID and/or activity session ID included in the received designated patron activity data file 84 and modifies the qualification flag ID included in the selected escrowed award record to indicate a "unqualified" status.

In one embodiment, upon receiving the patron activity data file 84, the promotion qualification processor 36 may access the award escrow data files 112 to identify any existing escrowed award record 114 having a "qualified" stats and including a Patron ID matching the Patron ID included in the received patron activity data file 84. The promotion qualification processor 36 then modifies the received patron activity data file 84 to include a qualification flag ID indicating a "unqualified" status based on the identified "qualified" existing escrowed award record 114, and the random celebration session processor 38 generates a linked escrowed award record 114 having qualification flag ID indicating the "unqualified" status based on the previously identified "qualified" existing escrowed award record 114. If, at a later time, the identified "qualified" existing escrowed award record 114 is modified to "unqualified" status, the random celebration session processor 38 may also modify the linked escrowed award record 114 to a "qualified" status. By generating linked escrowed award records 114, the promotions management computer server 12 may be programmed to prevent a patron from having multiple "qualified" escrowed award records 114.

In the illustrated embodiment, the trigger event feed processor 40 is configured to randomly generate a trigger event signal and transmit the trigger event signal to the random celebration award processor 42. For example, in some embodiments, the trigger event feed processor 40 may be configured to execute a mystery trigger algorithm that includes randomly selecting a trigger event number from a range of numbers, initiating a counter, and transmitting the transmit the trigger event signal when the counter matches the randomly selected trigger event number. The trigger event feed processor 40 may also transmit the trigger event signal upon detecting a designated activity such as, for example, a randomly selected period of time, a detected patron activity, or a predefined activity.

In some embodiments, upon receiving the trigger event signal from the trigger event feed processor 40, the random celebration award processor 42 is programmed to access the charm data file 58 and randomly select a promotional award charm ID 68 from the charm data file 58. The random celebration award processor 42 then accesses the award escrow data files 112 and selects escrowed award records 114 having patron selected charm IDs 68 matching the selected promotional award charm ID 68. The random celebration award processor 42 then retrieves the notification program files and corresponding device IDs from each selected escrowed award record 114 and transmits a notification data file including the notification program files and the device IDs to the prize notification delivery system processor 44.

The random celebration award processor 42 may also select escrowed award records 114 having patron selected charm IDs 68 matching the selected promotional award charm ID 68 and having a qualification flag ID indicating a "qualified status". The random celebration award processor 42 then retrieves the notification program files and corresponding device IDs from each selected escrowed award record having patron selected charm IDs 68 matching the selected promotional award charm ID 68 and having a qualification flag ID indicating a "qualified status", and transmits a notification data file including the notification program files and the device IDs to the prize notification delivery system processor 44. Upon receiving the notification data files from the random celebration award processor 42, the notification delivery system processor 44 is programmed to identify each patron computing device based on the corresponding device IDs, and transmit the notification program files to each identified patron computing device which cause each patron computing device to display a prize notification to the corresponding patron. The notification delivery system processor 44 is also programmed to transmit the notification program files to each identified patron computing device such that each prize notification is displayed substantially simultaneously to each corresponding patron location at each casino property 18.

In some embodiments, upon receiving the trigger event signal from the trigger event feed processor 40, the random celebration award processor 42 is programmed to access the award escrow data files 112, identify escrowed award records 114 having patron selected charm IDs 68 matching the selected promotional award charm ID 68 and having qualification flag ID indicating a "qualified status", and generate a promotion award file including each selected escrowed award records 114 having qualification flag ID indicating a "qualified status". The promotion award file may then be used to generate and/or transmits a notification data file including the notification program files and the device IDs to the prize notification delivery system processor 44, without affecting the award escrow data files 112. This allows the random celebration session processor 38 to continually update the award escrow data files 112 to include new escrowed award records 114 and/or modify existing escrowed award records 114 as the prize notification delivery system processor 44 delivers the notification messages. In some embodiment, upon receiving the trigger event signal the random celebration award processor 42 queries notification program files associated with escrowed award records 114 having patron selected charm IDs 68 matching the selected promotional award charm ID 68 and having qualification flag ID indicating a "qualified status", and transmits the queried notification program files to the prize notification delivery system processor 44, which then uses the property ID included in each notification program file to route the notification program files to the corresponding player tracking servers 16 for use in distributing the notification program files to the corresponding user devices based on the device ID included in each notification program file.

Figure 4:
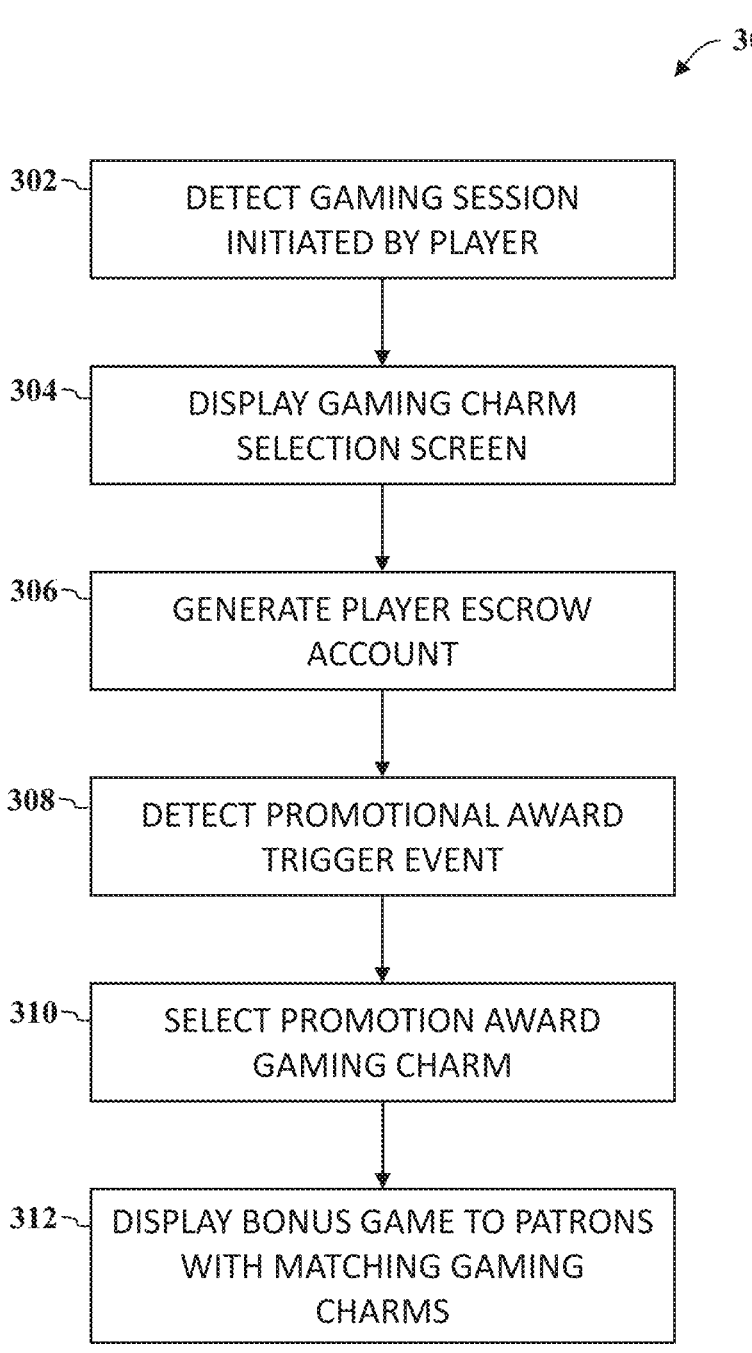
Figure 5:
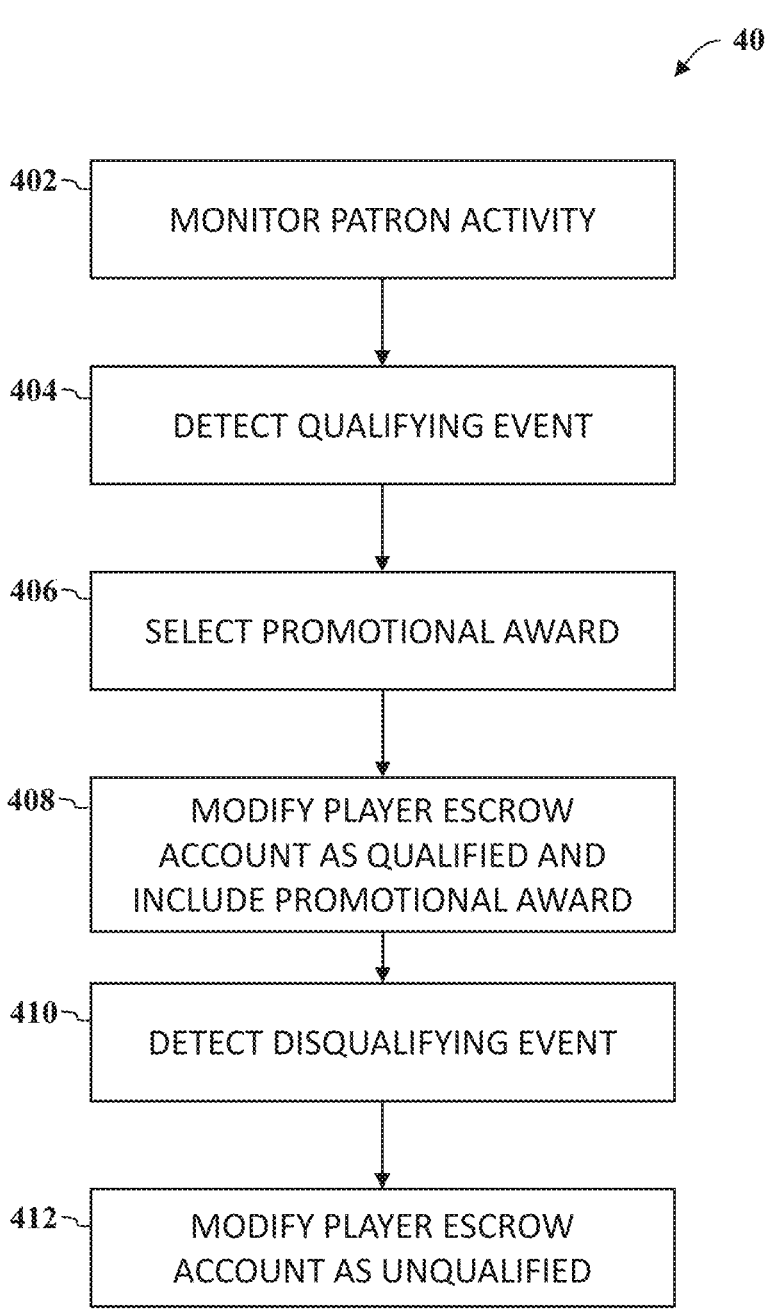
Figure 6:
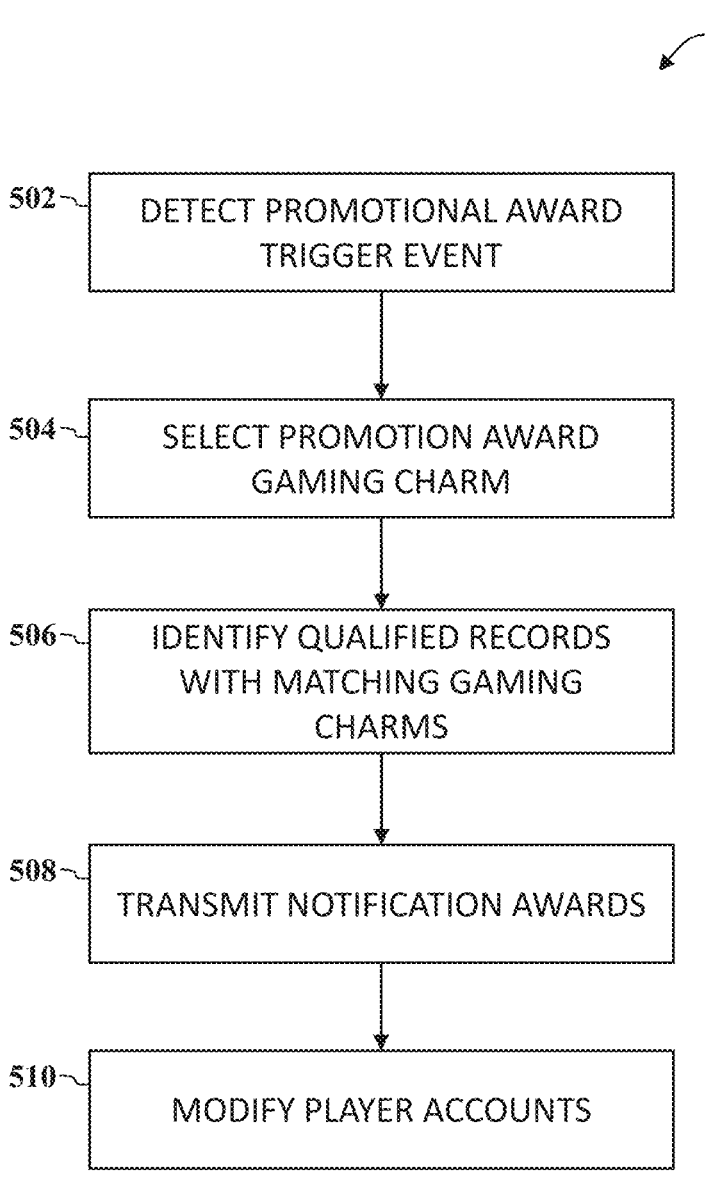
Figure 16:
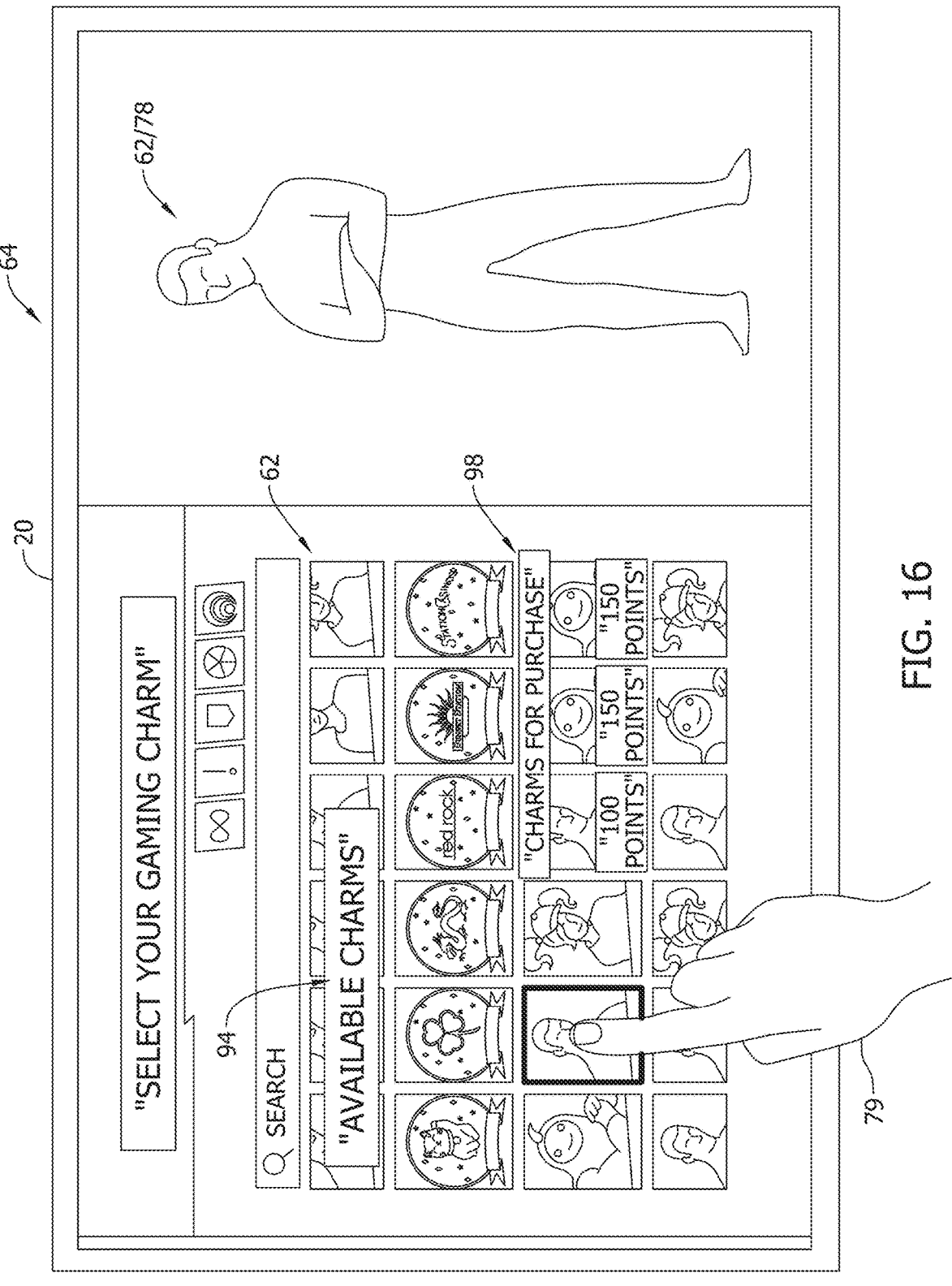
FIGS. 16-19 are illustrations of exemplary game screens that may be displayed on an electronic gaming machine, according to embodiments of the present invention.
Figure 17:
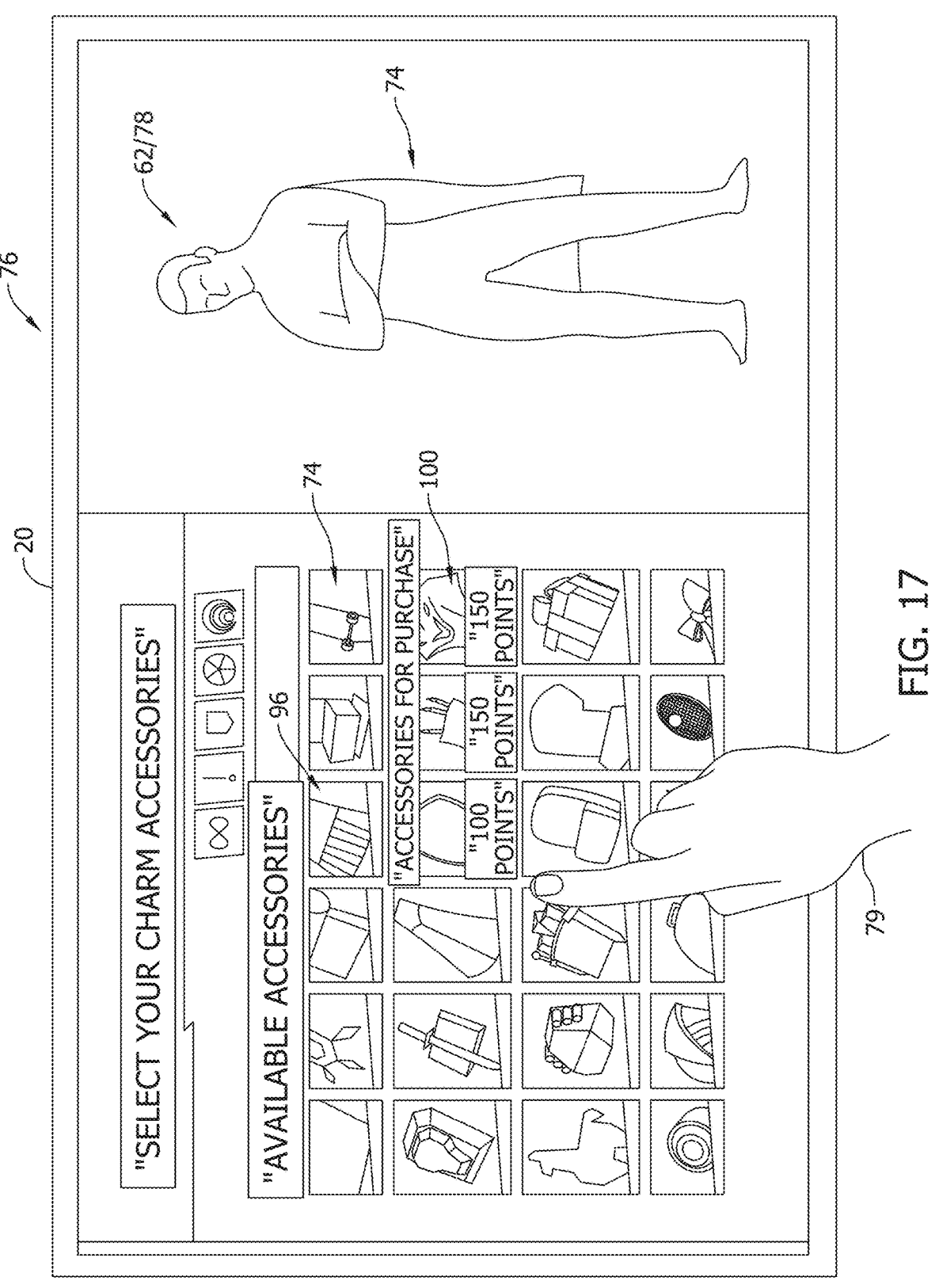
Figure 18:
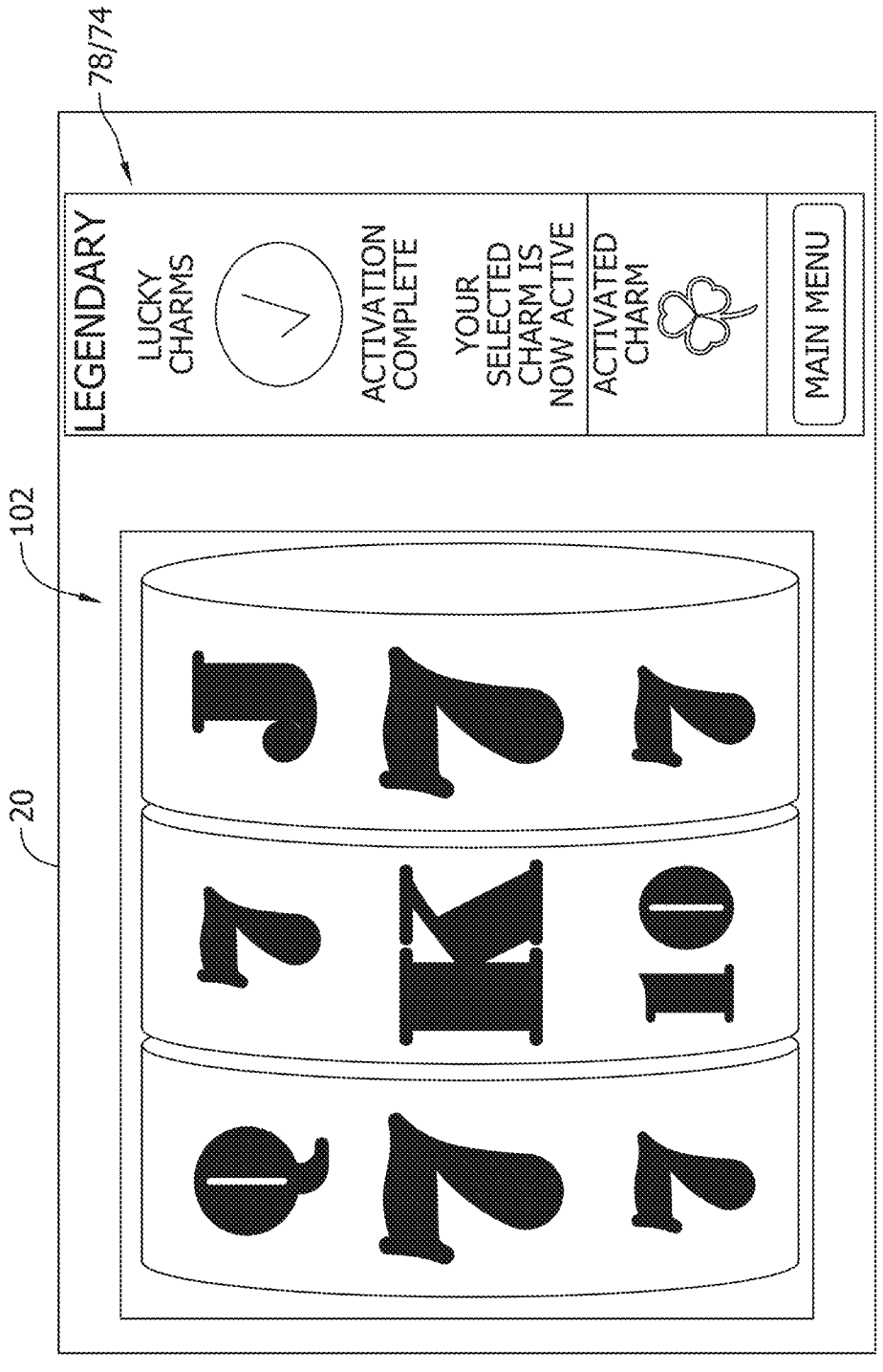
Figure 19:
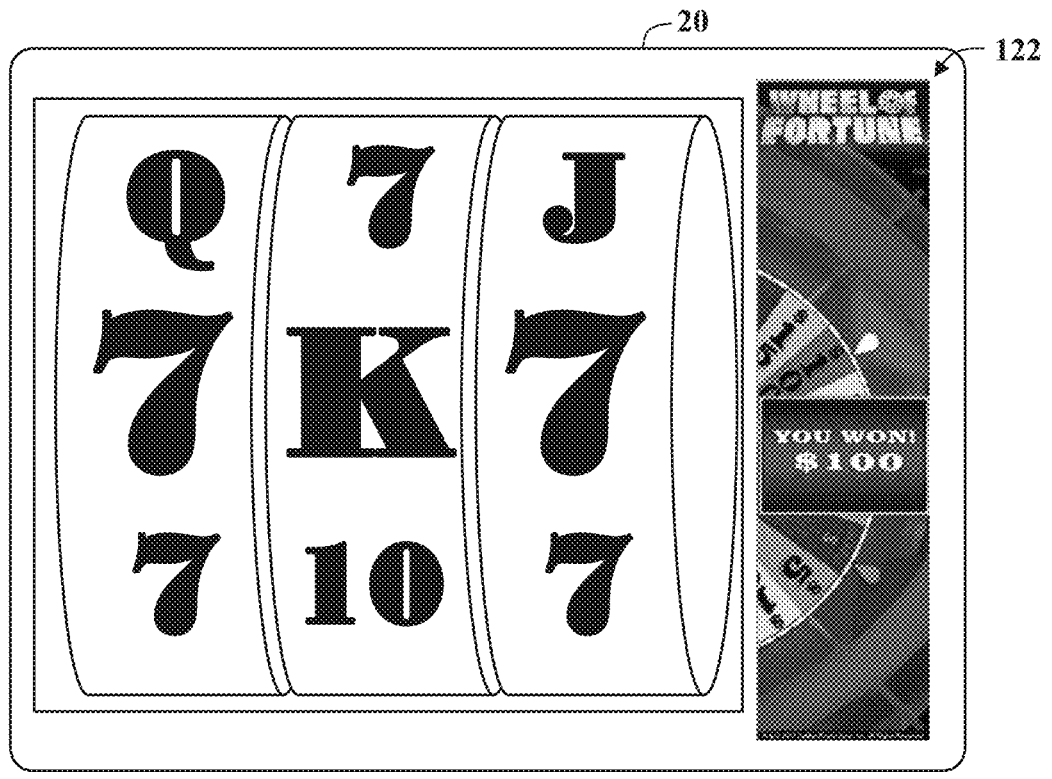

With reference to FIGS. 4-6, in the illustrated embodiment, the promotions management computer server 12 may be programmed to execute the algorithms 300, 400, and 500 for providing promotional awards to casino property patrons. The methods include a plurality of steps that may be performed independently of, or in combination with, other method steps. Portions of the methods may be performed by any one of, or any combination of, the components of the promotions management computer server 12.

In the illustrated embodiment, the promotions management computer server 12 is coupled to a plurality of player tracking servers 16. Each player tracking server 16 is located at a different casino gaming property and is coupled to a plurality of gaming devices 20. Each player tracking server 16 is configured to detect patron activity at the gaming devices 20 and transmit data indicating the patron activity to the promotions management computer server 12. One or more processors of the promotions management computer server 12 are programmed assign promotion awards to the patron based on the patron activity and to generate and store the award escrow data file 112 in the award data store database 46. The award escrow data file 112 includes the plurality of escrowed award records 114. Each escrowed award record 114 includes patron information including a patron ID and a unique session ID, award fulfilment instructions, messaging instructions, and a qualification status indicator indicating at least one of a qualified status and an unqualified status. The award escrow data file 112 is used to provide the escrowed promotional awards to patrons that are then awarded to patron when a trigger event is later detected.

In method step 302, the processor of the promotions management computer server 12 detect a gaming session being initiated by a patron. For example, the processor may receive a gaming request signal from a player tracking server 16 indicating a request from a patron to initiate a gaming session at a corresponding gaming device 20. The gaming request signal may include a patron ID 86 associated with the patron, a device ID 90 associated with the corresponding gaming device, and a session ID 88 associated with the gaming session.

In method step 304, the processor transmits instructions to cause a gaming charm selection screen 64 to be displayed on the gaming device to prompt the patron to select a gaming charm 62 to associate with the gaming session. For example, the processor may retrieve a patron account record 30 associated with the corresponding patron ID 86, determine charm IDs 68 that are included in the retrieved patron account record 30, retrieve image object data from a charm data file 58 indicating available gaming charms 94 associated with the charm IDs 68 included in the retrieved patron account record, and display available gaming charms 94 on the gaming charm selection screen 64.

In some embodiments, the processor may display a plurality of gaming charms 62 on the gaming charm selection screen 64 including the available gaming charms 94 associated with the charm IDs 68 included in the retrieved patron account record 30 and unavailable gaming charms 98. The processor may also highlight images of the available gaming charms 94 on the gaming charm selection screen 64. The processor may also display one or more unavailable gaming charms 98 with a corresponding amount of promotional points to purchase a corresponding unavailable gaming charm 98.

The processor may also transmit instructions to cause a charm accessory selection screen 76 to be displayed on the gaming device upon receiving a signal indicating the patron selected gaming charm 78. For example, the processor may, upon receiving the patron selected gaming charm 78, access a charm accessories file 60 including information indicating a plurality of charm accessories 74 associated with each gaming charm 62, and identify charm accessories 74 associated with the patron selected gaming charm 78. The processor may then display the charm accessory selection screen 76 including the identify charm accessories 74 associated with the patron selected gaming charm 78 prompting the patron to select one or more of the identified charm accessories 74 for use with the selected gaming charm 62. In some embodiments, the processor may display the charm accessory selection screen 76 including available charm accessories 96 and unavailable charm accessories 100 associated with the selected gaming charm 62. The processor may also highlight images of the available charm accessories 96 and/or display unavailable charm accessories 100 with a corresponding amount of promotional points to purchase a corresponding unavailable charm accessory 100.

In method step 306, the processor receives a patron selected gaming charm 78 and responsively generates an escrowed award record 114 in the award escrow data file 112 stored in a database 46. The escrowed award record 114 may include the session ID, the patron ID, the device ID, and a charm ID associated with the patron selected gaming charm 78.

In method step 308, the processor of the promotions management computer server 12 is programmed to detect a promotional award trigger event and initiation a promotional award event algorithm to simultaneously display a bonus game on each gaming device having a patron selected gaming charm 78 matching a randomly selected promotional award gaming charm.

In method step 310, upon detecting the promotional award trigger event, the processor randomly selects a promotional award charm ID 68 from the charm data file 58 that includes a plurality of charm IDs.

In method step 312, the processor accesses the award escrow data file 112 and identifies escrowed award records 114 having patron selected charm IDs 68 matching the randomly selected promotional award charm ID 68. The processor then identifies gaming devices having device IDs 90 associated with the identified escrowed award records 114 and displays a bonus game on each of the identified gaming devices. For example, in one embodiment, for each identified escrowed award records having patron selected charm IDs matching the randomly selected promotional award charm ID, the processor executes the corresponding messaging instructions to display the bonus game on each corresponding gaming device.

Referring to the algorithm 400 illustrated in FIG. 5, in some embodiments, the processor of the promotions management computer server 12 receives monitored patron activity from a player tracking server 16 and determines whether the monitored patron activity is a qualifying promotional event or a disqualifying promotional event.

For example, in method step 402 the processor may receive monitored patron activity included in a patron activity data file 84 transmitted by the player tracking server 16 that includes the patron ID 86 received from patron tracking ID card, the activity session ID 88 associated with the gaming session, the device ID 90 associated with the EGM 24, the property ID 92 indicating the corresponding casino property 18, the charm ID 68 associated with the patron selected gaming charm 78 and information associated with the wagering activity such as, for example, an amount of time at the EGM and/or an amount wagered over time.

In method step 404, the processor determines whether the patron activity data indicates a qualifying promotional event. For example, in one embodiment, the processor accesses the promotional event data files 104 to determine which promotions are currently active, and whether the patron activity data is a qualifying event or a disqualifying event associated with a currently active promotion.

In method step 406, upon determining the patron activity data indicates a qualifying promotional event, the processor selects a promotional award. For example, in one embodiment, the processor accesses the promotional award selection file 48 being stored in the database 46 and selects a promotional award using promotional award selection file 48.

In one embodiment, the promotional award selection file 48 includes a plurality of promotional awards and selection probabilities associated with each promotional award. The processor may be programmed to randomly select the promotional award using the promotional award selection file.

The promotional award selection file 48 may also include a plurality of tiered groups of promotional awards. Each tiered group is associated with a different patron ranking level. The processor may be programmed to identify a patron ranking level associated with the corresponding patron, and select the promotional award from the corresponding tiered group of promotional awards associated with the identified patron ranking level.

The processor may also be programmed to determine an award liability value upon determining the patron activity data indicates a qualifying promotional event and select the promotional award based on the determined award liability value. For example, the processor may determine the award liability value by accessing the award escrow data file and calculating the award liability value equal to a sum of the promotional awards included in escrowed award records having qualification status indicator indicating qualified status. The processor may then select the promotional award from the award paytables 52, 54, 56 (shown in FIG. 9) based on the determined award liability value. For example, the database 46 may include a plurality of promotional award paytables including a plurality of awards. The plurality of promotional award paytables may include a high-value award paytable 52 and a low-value award paytable 56, with the high-value award paytable including awards having a higher monetary value than awards included in the low-value paytable. The processor may select the promotional award from the high-value award paytable or the low-value award paytable based on the determined award liability value. For example, the processor may select the promotional award from the low-value award paytable if the determined award liability value is greater than a predefined liability award liability value.

In method step 408, the processor is programmed to modify the escrowed award record 114 associated with the corresponding patron activity to include corresponding award fulfilment instructions including the selected promotional award, corresponding messaging instructions including an award notification message, and a corresponding qualification status indicator indicating a qualified status. In one embodiment, the corresponding award fulfilment instructions cause the casino management system server 14 to identify each patron account record associated with each patron ID and modify each patron account record to include the promotional awards. The messaging instructions cause each gaming device to display a corresponding award notification message.

For example, in some embodiments, the award escrow data file includes a plurality of escrowed award records with each escrowed award record including patron information including a corresponding patron ID and a corresponding gaming session ID, award fulfilment instructions, messaging instructions, and a qualification status indicator indicating at least one of a qualified status and an unqualified status. The processor may be programmed to receive patron activity data associated with the session ID from the least one player tracking server indicating corresponding patron activity and determine whether the patron activity data indicates a qualifying promotional event. Upon determining the patron activity data indicates a qualifying promotional event, the processor may select a promotional award and modify the escrowed award record associated with the session ID to include the selected promotional award, corresponding award fulfilment instructions including the selected promotional award, and a corresponding qualification status indicator indicating a qualified status.

In method step 410, the processor receives a subsequent signal from the least one player tracking server including the corresponding session ID and subsequent patron activity data associated with corresponding patron activity. The processor accesses the award escrow data file, identifies the escrowed award record associated with the corresponding session ID, and determines whether the subsequent patron activity data indicates a disqualifying promotional event.

In method step 412, upon determining the subsequent patron activity data indicates a disqualifying promotional event, the processor modifies the identified escrowed award record to change the qualification status indicator to unqualified status.

Referring to the algorithm 500 illustrated in FIG. 6, in method step 502, the processor of the promotions management computer server 12 is programmed to detect a promotional award trigger event and initiation a promotional award event algorithm to simultaneously notify patrons of the escrowed promotional awards. For example, the processor may receive a triggering event signal from one of the plurality of player tracking servers and execute the promotional award event algorithm upon detecting the triggering event signal.

In method step 504, upon detecting the triggering event, the processor randomly selects a promotional award charm ID 68 from the charm data file 58 that includes a plurality of charm IDs.

In method step 506, accesses the award escrow data file 112 and identifies escrowed award records 114 having patron selected charm IDs matching the randomly selected promotional award charm ID and having qualification status indicators indicating qualified status.

In method step 508, for each identified escrowed award records having patron selected charm IDs matching the randomly selected promotional award charm ID and having qualification status indicator indicating qualified status, the processor executes the corresponding award fulfilment instructions to provide the selected promotional award to each patron, and executes the corresponding messaging instructions to display the award notification message on each corresponding gaming device. The processor executes the promotional award event algorithm to transmit the messaging instructions 126 to each gaming device associated with each device ID to cause each gaming device to display a corresponding award notification message substantially simultaneously.

In method step 510, the processor transmits the award fulfilment instructions 124 to the casino management system server 14 to cause the casino management system server 14 to identify each patron account record 30 associated with each patron ID and modify each patron account record 30 to include the promotional awards.

For example, in some embodiments, upon receiving the triggering event signal, the processor is programmed to determine each identify escrowed award records having charm IDs matching the selected promotional award charm ID and having qualification status indicators indicating qualified status. For each identified escrowed award records having qualification status indicator indicating qualified status, the processor executes the corresponding award fulfilment instructions to provide the selected promotional award to each patron.

In general, the system 10 includes a promotions management computer server 12 that is programmed to execute algorithms to implement a Random Celebration promotion that awards qualified players a prize when a configured Trigger Event Occurs such as, for example, the Wheel-of- Fortune™ Big Time Bonus™ promotional award program Luckiest Charm™ promotional award program offered by Station Casinos™. For example, when executing algorithms to implement the Random Celebration™ promotions and/or the Luckiest Charm™ promotional award program, the system allows patrons to select gaming charms to associate with a patron's gaming session, randomly selects a promotional award charm and provides promotional awards to each patron having a patron selected gaming charm matching the randomly selected promotional award charm. The promotions management computer server 12 improves existing casino management systems by generating escrow account data files that includes randomly selected promotional awards associated with casino patrons. The escrow account data files are generated to include modifiable qualification flag IDs to enable the promotions management computer server 12 to change an escrow account record from "qualified" status to a "unqualified" status during as promotions period. The promotions management computer server 12 also uses the escrow accounts to transmit award notifications to gaming devices 20 located at multiple casino properties, to enable a promotional award notification to occur nearly simultaneously at each casino property. Moreover, the escrow accounts enables the system 10 to determine a total amount of promotional awards that may be awarded at any time during the promotional period. By generating escrow account data files with modifiable qualification status indicators, the system is able to associate randomly selected promotional awards to qualifying patrons before the promotional awards are provided and/or awarded to the patrons, which reduces the amount of time and computer resources required to transmit the award notification messages upon detecting a random trigger event, and enables the system to determine a total amount of promotional awards that may be awarded at any time during a promotional period, which are features not currently available in existing casino management systems.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to, only including, MongoDB™ database engines which is a document storage solution, Oracle® Database, MySQL, IBM® Db2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A networked computer system, comprising:

a plurality of player tracking servers located at different casino properties, each player tracking server coupled to a corresponding plurality of electronic gaming machines (EGMs) located at a corresponding casino property and configured to monitor patron activity at the corresponding plurality of EGMs, each EGM including a display device including a graphical user interface (GUI) touchscreen display displaying computer-generated images thereon; and a promotions management computer server including one or more processors coupled to the plurality of player tracking servers;

wherein each player tracking server includes one or more processors programmed to execute a charm selection algorithm including the steps of:

receiving a gaming request signal from a corresponding EGM indicating a request from a patron to initiate a gaming session at the corresponding EGM, the gaming request signal including a patron ID associated with the patron and a device ID associated with the corresponding gaming device;

transmitting computer-executable instructions to the corresponding gaming device to render a gaming charm selection screen on a corresponding GUI touchscreen display of the corresponding EGM prompting the patron to select a gaming charm to associate with the gaming session;

receiving a patron selected gaming charm via the corresponding GUI touchscreen display and responsively modifying the game screen to display an image of the patron selected gaming charm; and transmitting a session message to the promotions management computer server including a session ID, the patron ID, the device ID, and a charm ID associated with the patron selected gaming charm; and wherein the promotions management computer server executes an award notification algorithm to simultaneously display an animated sequence of computer-generated images on selected EGMs including the steps of:

receiving the session message from a corresponding player tracking server and generating an escrowed award record written in JSON programming language stored in an award escrow data file and including the session ID, the patron ID, the device ID, the identified charm ID, and a notification program file including an award notification message and a routing code including the device ID for routing the award notification message to the corresponding EGM; and simultaneously displaying a computer-generated animated prize notification on selected EGMs by:

detecting a triggering event and responsively randomly selecting a promotional award charm ID from a charm data file including a plurality of charm IDs;

accessing the award escrow data file and identifying escrowed award records having charm IDs matching the selected promotional award charm ID;

identifying EGMs having device IDs associated with the identified escrowed award records;

querying notification program files associated with the identified escrowed award records; and routing the queried notification program files to each player tracking server to cause each player tracking server to distribute the queried notification program files to each identified EGM including the award notification message having computer executable instructions to cause each identified EGM to simultaneously display the computer-generated animated prize notification.

2. The networked computer system of claim 1, wherein the one or more processors of the promotions management computer server is programmed to execute the award notification algorithm including the steps of:

generating each escrowed award record including a qualification status indicator indicating at least one of a qualified status and an unqualified status; and simultaneously displaying a computer-generated animated prize notification on selected EGMs by:

accessing the award escrow data file and identifying escrowed award records having charm IDs matching the selected promotional award charm ID and having qualification status indicators indicating the qualified status.

3. The networked computer system of claim 2, wherein the one or more processors of the promotions management computer server is programmed to execute the award notification algorithm including the steps of:

receiving patron activity data associated with the session ID from the corresponding player tracking server indicating corresponding patron activity;

determining whether the patron activity data indicates a qualifying promotional event; and upon determining the patron activity data indicates a qualifying promotional event:

selecting a promotional award; and modifying the escrowed award record associated with the session ID to include the selected promotional award, corresponding award fulfilment instructions including the selected promotional award, and a corresponding qualification status indicator indicating a qualified status.

4. The networked computer system of claim 3, wherein the one or more processors of the promotions management computer server is programmed to execute the award notification algorithm including the steps of:

receiving a subsequent activity signal from the corresponding player tracking server indicating a disqualifying event associated with the patron ID; and modifying the escrowed award record associated with the patron ID to change the qualification status indicator to indicate an unqualified status.

5. The networked computer system of claim 3, wherein the one or more processors of the promotions management computer server is programmed to execute the award notification algorithm including the steps of:

identifying a patron ranking level associated with the corresponding patron ID; and selecting the promotional award based on the identified patron ranking level.

6. The networked computer system of claim 5, wherein the one or more processors of the promotions management computer server is programmed to execute the award notification algorithm including the steps of:

selecting the promotional award from a plurality of tiered groups of promotional awards associated with the identified patron ranking level.

7. A method of operating a networked computer system including a plurality of player tracking servers located at different casino properties and a promotions management computer server including one or more processors coupled to the plurality of player tracking servers, each player tracking server including one or more processors coupled to a corresponding plurality of electronic gaming machines (EGMs) located at a corresponding casino property and configured to monitor patron activity at the corresponding plurality of EGMs, each EGM including a display device including a graphical user interface (GUI) touchscreen display displaying computer-generated images thereon, the method including:

the one or more processors of each player tracking server executing a charm selection algorithm including the steps of:

receiving a gaming request signal from a corresponding EGM indicating a request from a patron to initiate a gaming session at the corresponding EGM, the gaming request signal including a patron ID associated with the patron and a device ID associated with the corresponding gaming device;

transmitting computer-executable instructions to the corresponding gaming device to render a gaming charm selection screen on a corresponding GUI touchscreen display of the corresponding EGM prompting the patron to select a gaming charm to associate with the gaming session;

receiving a patron selected gaming charm via the corresponding GUI touchscreen display and responsively modifying the game screen to display an image of the patron selected gaming charm; and transmitting a session message to the promotions management computer server including a session ID, the patron ID, the device ID, and a charm ID associated with the patron selected gaming charm; and the one or more processors of the promotions management computer server executing an award notification algorithm to simultaneously display an animated sequence of computer-generated images on selected EGMs including the steps of:

receiving the session message from a corresponding player tracking server and generating an escrowed award record written in JSON programming language stored in an award escrow data file and including the session ID, the patron ID, the device ID, the identified charm ID, and a notification program file including an award notification message and a routing code including the device ID for routing the award notification message to the corresponding EGM; and simultaneously displaying a computer-generated animated prize notification on selected EGMs by:

detecting a triggering event and responsively randomly selecting a promotional award charm ID from a charm data file including a plurality of charm IDs;

accessing the award escrow data file and identifying escrowed award records having charm IDs matching the selected promotional award charm ID;

identifying EGMs having device IDs associated with the identified escrowed award records;

querying notification program files associated with the identified escrowed award records; and routing the queried notification program files to each player tracking server to cause each player tracking server to distribute the queried notification program files to each identified EGM including the award notification message having computer executable instructions to cause each identified EGM to simultaneously display the computer-generated animated prize notification.

8. The method of claim 7, including the one or more processors of the promotions management computer server executing the award notification algorithm including the steps of:

generating each escrowed award record including a qualification status indicator indicating at least one of a qualified status and an unqualified status; and simultaneously displaying a computer-generated animated prize notification on selected EGMs by:

accessing the award escrow data file and identifying escrowed award records having charm IDs matching the selected promotional award charm ID and having qualification status indicators indicating the qualified status.

9. The method of claim 8, including the one or more processors of the promotions management computer server executing the award notification algorithm including the steps of:

receiving patron activity data associated with the session ID from the player tracking server indicating corresponding patron activity;

determining whether the patron activity data indicates a qualifying promotional event; and upon determining the patron activity data indicates a qualifying promotional event:

selecting a promotional award; and modifying the escrowed award record associated with the session ID to include the selected promotional award, corresponding award fulfilment instructions including the selected promotional award, and a corresponding qualification status indicator indicating a qualified status.

10. The method of claim 9, including the one or more processors of the promotions management computer server executing the award notification algorithm including the steps of:

receiving a subsequent activity signal from the player tracking server indicating a disqualifying event associated with the patron ID; and modifying the escrowed award record associated with the patron ID to change the qualification status indicator to indicate an unqualified status.

11. The method of claim 9, including the one or more processors of the promotions management computer server executing the award notification algorithm including the steps of:

identifying a patron ranking level associated with the corresponding patron ID; and selecting the promotional award based on the identified patron ranking level.

12. The method of claim 11, including the one or more processors of the promotions management computer server executing the award notification algorithm including the steps of:

selecting the promotional award from a plurality of tiered groups of promotional awards associated with the identified patron ranking level.

13. A non-transitory computer-readable storage media having computer-executable instructions embodied thereon to operate a networked computer system including a plurality of player tracking servers located at different casino properties and a promotions management computer server including one or more processors coupled to the plurality of player tracking servers, each player tracking server including one or more processors coupled to a corresponding plurality of electronic gaming machines (EGMs) located at a corresponding casino property and configured to monitor patron activity at the corresponding plurality of EGMs, each EGM including a display device including a graphical user interface (GUI) touchscreen display displaying computer-generated images thereon, when executed the computer-executable instructions cause:

the one or more processors of each player tracking server to execute a charm selection algorithm including the steps of:

receiving a gaming request signal from a corresponding EGM indicating a request from a patron to initiate a gaming session at the corresponding EGM, the gaming request signal including a patron ID associated with the patron and a device ID associated with the corresponding gaming device;

transmitting computer-executable instructions to the corresponding gaming device to render a gaming charm selection screen on a corresponding GUI touchscreen display of the corresponding EGM prompting the patron to select a gaming charm to associate with the gaming session;

receiving a patron selected gaming charm via the corresponding GUI touchscreen display and responsively modifying the game screen to display an image of the patron selected gaming charm; and transmitting a session message to the promotions management computer server including a session ID, the patron ID, the device ID, and a charm ID associated with the patron selected gaming charm; and the one or more processors of the promotions management computer server to execute an award notification algorithm to simultaneously display an animated sequence of computer-generated images on selected EGMs including the steps of:

receiving the session message from a corresponding player tracking server and generating an escrowed award record written in JSON programming language stored in an award escrow data file and including the session ID, the patron ID, the device ID, the identified charm ID, and a notification program file including an award notification message and a routing code including the device ID for routing the award notification message to the corresponding EGM; and simultaneously displaying a computer-generated animated prize notification on selected EGMs by:

detecting a triggering event and responsively randomly selecting a promotional award charm ID from a charm data file including a plurality of charm IDs;

accessing the award escrow data file and identifying escrowed award records having charm IDs matching the selected promotional award charm ID;

identifying EGMs having device IDs associated with the identified escrowed award records;

querying notification program files associated with the identified escrowed award records; and routing the queried notification program files to each player tracking server to cause each player tracking server to distribute the queried notification program files to each identified EGM including the award notification message having computer executable instructions to cause each identified EGM to simultaneously display the computer-generated animated prize notification.

14. The non-transitory computer-readable storage media of claim 13, wherein the computer-executable instructions cause the one or more processors of the promotions management computer server to execute the award notification algorithm including the steps of:

generating each escrowed award record including a qualification status indicator indicating at least one of a qualified status and an unqualified status; and simultaneously displaying a computer-generated animated prize notification on selected EGMs by:

accessing the award escrow data file and identifying escrowed award records having charm IDs matching the selected promotional award charm ID and having qualification status indicators indicating the qualified status.

15. The non-transitory computer-readable storage media of claim 14, wherein the computer-executable instructions cause the one or more processors of the promotions management computer server to execute the award notification algorithm including the steps of:

receiving patron activity data associated with the session ID from the player tracking server indicating corresponding patron activity;

determining whether the patron activity data indicates a qualifying promotional event; and upon determining the patron activity data indicates a qualifying promotional event:

selecting a promotional award; and modifying the escrowed award record associated with the session ID to include the selected promotional award, corresponding award fulfilment instructions including the selected promotional award, and a corresponding qualification status indicator indicating a qualified status.

16. The non-transitory computer-readable storage media of claim 15, wherein the computer-executable instructions cause the one or more processors of the promotions management computer server to execute the award notification algorithm including the steps of:

receiving a subsequent activity signal from the player tracking server indicating a disqualifying event associated with the patron ID; and modifying the escrowed award record associated with the patron ID to change the qualification status indicator to indicate an unqualified status.

17. The non-transitory computer-readable storage media of claim 15, wherein the computer-executable instructions cause the one or more processors of the promotions management computer server to execute the award notification algorithm including the steps of:

identifying a patron ranking level associated with the corresponding patron ID; and selecting the promotional award based on the identified patron ranking level.

* * * * *